(12) United States Patent
Heshmat Dehkordi et al.

(10) Patent No.: US 10,796,190 B2
(45) Date of Patent: Oct. 6, 2020

(54) METHODS AND APPARATUS FOR IMAGING OF LAYERS

(71) Applicants: Massachusetts Institute of Technology, Cambridge, MA (US); Georgia Tech Research Corporation, Atlanta, GA (US)

(72) Inventors: Barmak Heshmat Dehkordi, San Mateo, CA (US); Albert Redo-Sanchez, Zizur Mayor (ES); Ramesh Raskar, Cambridge, MA (US); Alireza Aghasi, Chamblee, GA (US); Justin Romberg, Decatur, GA (US)

(73) Assignees: Massachusetts Institute of Technology, Cambridge, MA (US); Georgia Tech Research Corporation, Atlanta, GA (US)

( * ) Notice: Subject to any disclaimer, the term of this patent is extended or adjusted under 35 U.S.C. 154(b) by 218 days.

(21) Appl. No.: 16/059,144

(22) Filed: Aug. 9, 2018

(65) Prior Publication Data

US 2019/0050669 A1 Feb. 14, 2019

Related U.S. Application Data

(60) Provisional application No. 62/543,375, filed on Aug. 10, 2017.

(51) Int. Cl.
*G06K 9/46* (2006.01)
*G06K 9/00* (2006.01)
(Continued)

(52) U.S. Cl.
CPC ....... *G06K 9/4642* (2013.01); *G06K 9/00543* (2013.01); *G06K 9/2018* (2013.01); *G06K 9/522* (2013.01); *G06K 2209/01* (2013.01)

(58) Field of Classification Search
CPC .................................................. G06K 9/4642
See application file for complete search history.

(56) References Cited

U.S. PATENT DOCUMENTS 6,078,047 A 6/2000 Mittleman et al.
6,438,261 B1 8/2002 Moshe et al.
(Continued)

OTHER PUBLICATIONS

"Terahertz time-gated spectral imaging for content extraction through layered structures" including Supplemental Information, Natural Communications 7:12665 doi: 10.1038/ncomms12665 (2016) (Redo-Sanchez et al).*

(Continued)

*Primary Examiner* — Myron Wyche
(74) *Attorney, Agent, or Firm* — Stephen R. Otis

(57) ABSTRACT

A sensor may measure light reflecting from a multi-layered object at different times. A digital time-domain signal may encode the measurements. Peaks in the signal may be identified. Each identified peak may correspond to a layer in the object. For each identified peak, a short time window may be selected, such that the time window includes a time at which the identified peak occurs. A discrete Fourier transform of that window of the signal may be computed. A frequency frame may be computed for each frequency in a set of frequencies in the transform. Kurtosis for each frequency frame may be computed. A set of high kurtosis frequency frames may be averaged, on a pixel-by-pixel basis, to produce a frequency image. Text characters that are printed on a layer of the object may be recognized in the frequency image, even though the layer is occluded.

20 Claims, 6 Drawing Sheets

(51) Int. Cl.
G06K 9/20 (2006.01)
G06K 9/52 (2006.01)

(56) References Cited

U.S. PATENT DOCUMENTS

2007/0235658 A1    10/2007   Zimdars et al.
2010/0108889 A1    5/2010    Shen et al.

OTHER PUBLICATIONS

Aghasi, A., et al., Convex Cardinal Shape Composition; published in arXiv:1501.01347, Oct. 7, 2015.

Aghasi, A., et al., Convex cardinal shape composition and object recognition in computer vision; published in 2015 49th Asilomar Conference on Signals, Systems and Computers, IEEE, 2015.

Antoni, J., The spectral kurtosis: a useful tool for characterising non-stationary signals; published in Mechanical Systems and Signal Processing, vol. 20, Issue 2, pp. 282-307, Feb. 2006.

Fisher, S., Scientists Read Rolled-Up, Volcano-Charred Pompeii Scrolls; published Mar. 2016 in Laserfiche, https://www.laserfiche.com/ecmblog/scientists-read-rolled-up-volcano-charred-pompeii-scrolls/.

Maddala, V., Spectral Kurtosis Theory : A Review through Simulations; published in Global Journal of Researches in Engineering: F Electrical and Electronics Engineering, vol. 15, Issue 6, Version 1.0 Year 2015.

Nita, G., et al., The Generalized Spectral Kurtosis Estimator; published in arXiv:1005.4371, May 24, 2010.

Priya, A., et al., Online and offline character recognition: A survey; published in 2016 International Conference on Communication and Signal Processing (ICCSP); IEEE, Apr. 2016.

Redo-Sanchez, A., transcript and images from TEDxBeaconStreet talk "Unlimited Vision", published Dec. 4, 2015, at https://www.youtube.com/watch?v=Nu-loNHGxF8.

Singh, S., Optical Character Recognition Techniques: A survey; published in International Journal of Advanced Research in Computer Engineering & Technology (IJARCET), vol. 2, Issue 6, Jun. 2013.

Ye, Q., Text Detection and Recognition in Imagery: A Survey; published in IEEE Transactions on Pattern Analysis and Machine Intelligence, vol. 37, Issue 7, Jul. 2015.

* cited by examiner

METHODS AND APPARATUS FOR IMAGING OF LAYERS

RELATED APPLICATIONS

This application claims the benefit of U.S. Provisional Application No. 62/543,375 filed Aug. 10, 2017 (the "Provisional").

FIELD OF TECHNOLOGY

The present invention relates generally to imaging of layers.

COMPUTER PROGRAM LISTING

The following nineteen computer program files are incorporated by reference herein: (1) ADHTC.txt with a size of about 1 KB; (2) ADHTCImage.txt with a size of about 2 KB; (3) ClusterADHTC.txt with a size of about 1 KB; (4) CutoffDelayADHTC.txt with a size of about 1 KB; (5) FitLayersVolume.txt with a size of about 1 KB; (6) GenerateXImages.txt with a size of about 1 KB; (7) IdentityLayer.txt with a size of about 1 KB; (8) LAYER1_recovery.txt with a size of about 2 KB; (9) LAYER2_recovery.txt with a size of about 2 KB; (10) LAYER3_recovery.txt with a size of about 2 KB; (11) LAYER4_recovery.txt with a size of about 2 KB; (12) LAYER5_recovery.txt with a size of about 2 KB; (13) LAYER6_recovery.txt with a size of about 2 KB; (14) LAYER7_recovery.txt with a size of about 2 KB; (15) LAYER8_recovery.txt with a size of about 2 KB; (16) LAYER9_recovery.txt with a size of about 2 KB; (17) MapLayersIntensity.txt with a size of about 1 KB; (18) PlotPosNegAddImages.txt with a size of about 1 KB; and (19) preProcess.txt with a size of about 1 KB. All nineteen of these computer program files were created as an ASCII .txt file on Jul. 25, 2018.

SUMMARY

In illustrative implementations of this invention, an imaging system captures images of multiple layers in a layered object. The imaging system may capture images of the multiple layers, even though the layers are stacked in such a way that each layer (except the front layer), is not in direct view of the imaging system, but instead is occluded by the layer(s) in front of it. For each particular layer (except the front layer), the imaging system may "see through" occluding layers to capture an image of the particular layer. For instance, the imaging system may "see through" five layers and capture an image of the sixth layer.

In illustrative implementations, the imaging system may detect, for a given layer, at least one optical pattern (e.g., letter or number) that is written or printed on (or otherwise displayed by) the given layer.

In some implementations, the imaging system is a time-of-flight ("ToF") imaging system. The ToF imaging system may capture the images formed by light in the optical spectrum (less than 30 PHz and greater than or equal to 300 GHz). For instance, the ToF imaging system may capture images formed by light in the terahertz spectrum, infrared spectrum, visible spectrum, or ultraviolet spectrum.

For example, a terahertz time-domain spectroscopy (THz-TDS) imaging system may be employed to capture time-of-flight images of paper pages of a closed book, where the images are formed by light in the terahertz spectrum.

In illustrative implementations, the ToF sensor emits light at a frequency at which the multi-layered object is partly transmissive and partly reflective. Thus, in illustrative implementations, each layer of the multi-layered object partially reflects and partially transmits light at the frequency emitted by the ToF sensor.

In many implementations: (a) an imaging sensor (e.g., a ToF sensor) captures the images of the multiple layers of a layered object from a single, constant position (and at a single, constant orientation) relative to the layered object; and (b) thus, the position and orientation of the ToF sensor relative to the layered object does not vary from image to image (unlike tomography in which images are captured from multiple different angles relative to the object being imaged).

In illustrative implementations of this invention, images captured by the imaging sensor are processed to detect content (e.g., a letter, number or punctuation mark) that is printed, written, or otherwise displayed on the stacked layers. For instance, the content that is recognized may comprise text written or printed on different pages in a closed book.

In illustrative implementations, images of each layer, in a set of layers of a solid, multi-layered object, are captured by a method that includes (1) detecting peaks in a time-domain signal that encodes measurements taken at different times by a ToF sensor; and (2) performing kurtosis filtering of the signal in the frequency domain. For instance, in some implementations, an imaging sensor (e.g., a ToF sensor) may measure intensity of incident light at different times, and a computer may: (a) identify peaks in amplitude in a time-domain signal that encodes the measurements; and (b) for each identified peak in the signal, (i) calculate a discrete Fourier transform (DFT) of a time window of the time-domain signal, which window includes the time at which the identified peak occurred; (ii) compute frequency frames (as defined herein) at a set of frequencies in the DFT; (iii) compute kurtosis of each frequency frame; (iv) select a set of frequency frames that have a kurtosis that exceeds a threshold (high kurtosis frequency frames); and (v) average the high kurtosis frequency frames, on a pixel-by-pixel basis, to produce a frequency image. The method described in the preceding sentence may produce a frequency image (as defined herein) for each layer in a set of layers in the multi-layered object. In illustrative implementations, a frequency image may clearly show content that is printed or written on a layer, even though the layer is occluded from direct view of the ToF sensor by objects (e.g., other layers) that are opaque in the visible spectrum.

This ability to capture clear images of content that is printed or written on occluded layers of a multi-layered object is a major improvement to imaging technology. It overcomes at least three problems with conventional imaging techniques (including conventional THz-TDS imaging techniques). These three problems are: (1) SNR (signal-to-noise ratio) may decrease as depth increases (or as number of occluding layers increases); (2) the contrast of the content may be much lower than the contrast between layers of the multi-layered object; and (3) the content of deeper layers may be occluded by content from front layers. In illustrative implementations, contrast is greatly enhanced by kurtosis filtering in the frequency domain. This enhanced contrast mitigates the first two problems identified above (decreasing SNR with increasing depth, and low contrast of content). Furthermore, the third problem (content from front layers occluding content of rear layers) is greatly mitigated by "locking onto" each layer separately by time-windowing.

Specifically, in illustrative implementations, each layer is analyzed separately by: (a) determining a time at a peak of light reflecting from the layer is incident on a ToF sensor (and thus determining depth of the layer); (b) selecting a short time window that includes the peak; (c) performing a DFT on a vector that comprises only measurements taken by the ToF sensor during the time window; and (d) using this DFT to perform kurtosis filtering in the frequency domain. By analyzing each layer separately, occlusion by content of other layers is greatly mitigated. Indeed, in illustrative implementations, the three problems are mitigated to such an extent that clear images of occluded layers are captured.

In many implementations of this invention, an imaging sensor (e.g., a ToF sensor) illuminates the layered object with pulsed light. Each pulse of emitted light may travel to the layered object and then reflect from multiple layers in the layered object. Light in the pulse may travel different round trip distances (from the imaging sensor to the layered object and then back) depending on which layer the pulse reflects from. For example, a portion of the pulse that reflects from the front layer may travel a shorter round-trip distance than, and may arrive at the imaging sensor before, a portion of the pulse that reflects from a layer that is behind the front layer. Thus, a single pulse of emitted light may reflect from multiple layers of a layered object, in such a way that multiple pulses of reflected light return from the layered object to the imaging sensor, each at a different time of arrival at the imaging sensor.

For example, in some use scenarios, a pulse of emitted light reflects back from multiple layers in a layered object, in such a way that the light reflecting from the emitted pulse reflects back in multiple pulses, each due to light that reflects from a different depth in the layered object.

In some implementations, intensity of light that reflects from the layered object and is incident on a ToF sensor is measured during a period of time by the ToF sensor. (Or, if the ToF sensor is a THz-TDS sensor, electric field strength may be measured over a period of time, as an indirect measurement of incident light intensity).

In some implementations, a digital signal that is discrete in both time and amplitude (a "digital time-domain signal") may encode discrete samples of measurements taken by an imaging sensor (e.g., a ToF sensor). For instance, a ToF sensor, alone or together with an analog-to-digital converter (ADC), may output the digital signal.

In some implementations, the digital time-domain signal may be of the form f[x, y, t], where x and y are spatial coordinates of a pixel in a ToF sensor and where t is time. Thus, the digital time-domain signal may comprise a data cube where each discrete point in the data cube represents light intensity at a point in space-time which has spatial coordinates x and y and temporal coordinate t. The value of f[x, y, t] may be intensity of incident light at pixel x, y of the ToF sensor at time t. Or, equivalently, in the case of a THz-TDS sensor, the value of f[x, y, t] may be electric field strength at pixel x, y of the THz-TDS sensor at time t. (As noted above, a THz-TDS sensor may indirectly measure incident light intensity by measuring electric field strength).

A computer may analyze this digital time-domain signal to identify peaks amplitude in the time-domain signal. In some cases, for a set of layers in the layered object: (a) there is only one identified peak per layer; and (b) each of the identified peaks corresponds to at least the front surface of a layer of the layered object being imaged.

In some cases, each amplitude peak in the time-domain signal may be due to a single pulse of reflected light or due to multiple pulses of reflected light that are so close together in time that the ToF sensor cannot resolve them. For instance, in some use scenarios, the thickness of each layer being imaged is much greater than the air gap between the layers. In these use scenarios: (a) two pulses of reflected light may reflect from each layer, one from the front surface and the other from the back surface of the layer; (b) the back surface of one layer and the front surface of the next layer may be so close together in distance that the ToF sensor cannot resolve reflections from them in time; (c) thus, for light reflecting from the back surface of one layer and the front surface of the next layer, a pixel of the ToF sensor may detect only a single pulse; and (d) thus, if an emitted pulse reflects back from n layers, a pixel in the ToF sensor may detect n+1 reflected pulses, one detected pulse per layer except for two detected pulses from the last layer.

In some cases, amplitude peaks in a digital time-domain signal captured by an imaging system are identified by a method that includes the following six steps:

Step 1. The first derivative (speed) of the digital time-domain signal may be computed. For instance, the first derivative (speed) may be calculated by numerical methods. For example, the first derivative (speed) of the digital time-domain signal may be calculated by finite difference approximation.

Step 2: The first derivative and the amplitude of the time-domain signal may be normalized with respect to their standard deviations. Specifically: (b) normalized amplitude u may be calculated by dividing amplitude by the standard deviation of the amplitude; and (b) normalized first derivative v may be calculated by dividing first derivative by the standard deviation of the first derivative. For instance, in some cases: (a) the ToF sensor is a THz-TDS sensor; (b) the THz-TDS sensor measures electric field strength, as a proxy for incident light intensity; (c) u is normalized electric field strength; and (d) v is normalized first derivative (speed) of the electric field strength.

Step 3: A first threshold may be applied, to help select candidates for extremal values. Specifically, points in the digital time-domain signal f[x, y, t] may be identified at which a parameter E is above a specified threshold. Parameter E may be $E \equiv u^2 e^{-v^2}$, where u is normalized amplitude, v is normalized first derivative, and e is Euler's number. As can be seen, parameter E is defined in such a way that E is high for higher amplitudes and lower speeds. This provides a filter that filters out noise and retains temporal points that are candidates to be extremal (i.e., candidates to be peaks). These candidates may be local extremal values of the time-domain signal.

Step 4: A second threshold may be applied, to help select candidates for extremal values. Specifically, points in the digital time-domain signal f[x, y, t] may be identified that have a likelihood (of having an extremal value of the signal) that is greater than a specified threshold. The likelihood p of a point being an extremal point in the signal may be computed as $$p(u, v) \to 4\left(\mathrm{erf}(|u|) - \frac{1}{2}\right)\left(\frac{3}{2} - \mathrm{erf}(|v|)\right),$$

where "erf" is the single-sided cumulative error function, and u and v are normalized amplitude and speed, respectively.

In some cases, only points (in the digital time-domain signal f[x, y, t]) that satisfy both the first and second thresholds (in Steps 3 and 4, respectively) are selected as candidates for extremal points. In turn, these candidate points are inputs for k-means clustering.

Step 5: K-means clustering may be performed to identify clusters of the candidate points.

Step 6: For each cluster, the point in the cluster that has the highest absolute amplitude may be selected as the location of a peak.

In some cases, different pixels in the ToF sensor measure slightly different times for a particular peak (which corresponds to a particular reflected pulse). The measured arrival times for a single pulse of reflected light that reflects from a single reflective surface in the layered object (e.g., to the front surface of a given layer) may vary slightly from pixel to pixel but may be clustered tightly together in a single cluster. In Steps 5 and 6 above, clusters are calculated and a single time is identified for each cluster, respectively. An algorithm may assign this single time as the time at which an identified peak in the time-domain signal occurs. Thus, effectively, the algorithm may determine a single depth for a particular region (e.g., front surface) of a layer.

The preceding six steps (Steps 1 to 6) may output a set of identified peaks. Specifically, the preceding six steps may output, for each particular peak in the set of peaks, a time at which the particular peak occurs. In this set of identified peaks, the first (in time) identified peak may correspond to a pulse of light reflecting from the front surface of the first layer. The second (in time) identified peak may correspond to light reflecting from the back of the first layer and from the front of the second layer. The third (in time) identified peak may correspond to light reflecting from the back of the second layer and from the front of the third layer. And so on, until layer n (the rearmost identified layer). The $(n)^{th}$ identified peak may correspond to light reflecting from the back of the $(n-1)^{th}$ layer and from the front of the $(n)^{th}$ layer. The $(n+1)^{th}$ identified peak may correspond to light reflecting from the back of the $(n)^{th}$ layer. In this paragraph, the layers are numbered in order of depth, so that the lower the ordinal number of a layer, the closer (in optical distance) the layer is to the ToF sensor.

An image may be computed for each identified peak. For instance: (a) an identified peak may correspond to at least the front surface of a layer of the layered object; and (b) the image for the identified peak may show a letter or number that is printed on the front surface of that layer.

In some cases, kurtosis filtering in the frequency domain is performed while computing an image for an identified peak. (As noted above, the image for an identified peak may show at least the front surface of a particular layer) This kurtosis filtering may enhance contrast of the image.

In some implementations, an image for an identified peak is computed by a method that includes kurtosis filtering in the frequency domain, as described in Steps 6 to 11 below.

Step 6: For each identified peak (identified as described above, in Steps 1 to 6), a short time window of the time-domain signal $f[x, y, t]$ may be identified. This time window may include (e.g., be centered on) the time of that identified peak. In some cases, this time window may have a duration of approximately 3 picoseconds.

For each time window, respectively, Steps 7 to 11 are performed. The calculations in Steps 7 to 11 are done on separately for each time window. In some cases, each time window corresponds to at least the front surface of a particular layer in the layered object. Thus Steps 7 to 11 may be calculated on a layer-by-layer basis.

For each particular time window:

Step 7: A DFT (discrete Fourier transform) $f[x, y, t]$ may be computed to transform the portion of the time-domain signal in which time is within the particular time window. The absolute value of the amplitude of this DFT is calculated and is denoted herein as $f[x, y, \omega]$, where x and y are spatial coordinates of a pixel in the ToF sensor and where $\omega$ is angular frequency. The DFT may be computed on a pixel-by-pixel basis. Thus, for each pixel $(x, y)$, a DFT may be computed for a vector of measurements taken by the pixel in the particular time window.

Step 8: Frequency frames may be computed, each at a different frequency in the amplitude spectrum of the DFT. Each frequency frame may be computed on a pixel-by-pixel basis.

As used herein, "frequency frame" means an image, in which: (a) at each specific pixel of the image, the value of the image is equal to, or derived from, modulus of the amplitude spectrum of a DFT at a specific frequency, which DFT is a discrete Fourier transform of a time-domain signal that encodes measurements taken by the specific pixel; and (c) the specific frequency is the same for all pixels of the image.

Step 9: The kurtosis of each frequency frame may be computed.

Step 10: A set of high-kurtosis frequency frames may be selected. Specifically, each frequency frame in the set may have a kurtosis value that is above a threshold value.

Step 11: A frequency image $I_f(x, y)$ for the particular time window may be computed by averaging, on a pixel-by-pixel basis, the high-kurtosis frequency frames for that particular time window.

The kurtosis filtering that occurs in Steps 9 to 11 may enhance the contrast of frequency image $I_f(x, y)$. This kurtosis filtering may enhance contrast because: (a) in high contrast images, sharp peaks may be likely to occur about low and high intensity values; (b) kurtosis is, loosely speaking, a measure of peakedness of a probability density function; and (c) thus, selecting frequency images with high kurtosis and averaging these high kurtosis images may produce an image with high contrast.

As used herein, "frequency image" means an image, in which the value of each specific pixel of the image is a measure of central tendency of values of the specific pixel in a set of frequency frames. As a non-limiting example, if a frequency image is computed by averaging, on a pixel-by-pixel basis, a first frequency frame, a second frequency frame and a third frequency frame, and if the first, second and third frequency frames have values of 1, 4, and 7, respectively, at a specific pixel, then the value of the frequency image at the specific pixel is $(1+4+7)/3=4$.

A frequency image $I_f(x, y)$ may appear similar to an ordinary photograph of a layer of the layered object, except that it is a high contrast image. Impressively, a frequency image $I_f(x, y)$ of a layer may be captured, even though the layer is occluded (in the visible spectrum) by one or more other layers that are in front of it.

The value of frequency image $I_f(x, y)$ at a particular pixel $(x, y)$ may be calculated by averaging modulus of amplitude in the frequency domain at this particular pixel $(x, y)$ in a set of high kurtosis frequency frames. The value of frequency image $I_f(x, y)$ for a particular pixel $(x, y)$ may correspond to a filtered intensity of incident light at this particular pixel $(x, y)$. Equivalently, if the ToF sensor is a THz-TDS sensor, then value of frequency image $I_f(x, y)$ for a particular pixel $(x, y)$ may correspond to a filtered electric field strength at this particular pixel $(x, y)$. In both cases, the intensity of incident light (or electric field strength) may be filtered due to kurtosis filtering (in the frequency domain) to enhance contrast, as described above.

In many implementations of this implementations: (a) a frequency image $I_f(x, y)$ has only two orthogonal coordinate axes; (b) the two orthogonal coordinate axes of a frequency image $I_f(x, y)$ are spatial axes (e.g., x and y axes); and (c) the two orthogonal coordinate axes of a frequency image $I_f(x, y)$ are not frequency axes. (Note: the frequency axes—also known as transform axes—of a 2D DFT F(u, v) are commonly denoted u and v).

Likewise, in many implementations of this invention: (a) a frequency frame has only two orthogonal coordinate axes; (b) the two orthogonal coordinate axes of a frequency frame are spatial axes (e.g., x and y axes); and (c) the two orthogonal coordinate axes of a frequency frame are not frequency axes.

A separate frequency image $I_f(x, y)$ may be computed for each time window. Since each time window corresponds to an identified peak, a separate frequency image $I_f(x, y)$ may be computed for each identified peak. As noted above, in some cases, for a set of layers in the multi-layered object: (a) there is only one identified peak per layer; and (b) each identified peak corresponds to at least the front surface of a layer. Thus, in some cases, a separate frequency image $I_f(x, y)$ may be calculated for each layer in a set of layers in a layered object. For instance, each frequency image $I_f(x, y)$ may comprise a high-contrast image which shows text that is printed or written on the front surface of a particular layer.

In some implementations, after a frequency image $I_f(x, y)$ is produced, computer vision (e.g., optical character recognition) is performed to recognize content in the image. For instance, the computer vision may recognize one or more text characters or words that are written or printed on a surface shown in the image.

As noted above, in many implementations, a layered object is illuminated with pulsed light.

Alternatively, in some cases, an imaging sensor (e.g., a ToF sensor) may illuminate the layered object with light that is not pulsed (e.g., continuous-wave light). In these alternative cases (in which light is not pulsed), intensity of incident light as a function of phase of incident light may be measured. The phase of light incident at the imaging sensor which has reflected from a given layer of the layered object may depend on the depth of the given layer (or equivalently, may depend on the round trip distance that the light travels when reflecting from the given layer, or equivalently, may depend on the time elapsed while the light travels to and from the given layer).

In some cases, a computer: (a) may convert measured phase into units of time; and (b) may output a digital time-domain signal that encodes incident light intensity as a function of time. This time-domain signal may be processed as described above, in Steps 1 to 11 above.

Alternatively, an imaging sensor (e.g., a ToF sensor) may measure intensity of incident light as a function of phase of incident light, and a computer may: (a) identify peaks in amplitude in a phase-domain signal (a signal whose domain is phase), where the phase-domain signal encodes or is derived from the measurements and the peaks encode depth information; and (b) for each identified peak in the phase-domain signal (i) compute a DFT of a window of the phase-domain signal which includes the phase at which the identified peak occurs; (ii) compute frequency frames at a set of frequencies in the DFT; (iv) compute kurtosis of each frequency frame; (v) select a set of frequency frames that have a kurtosis that exceeds a threshold (high kurtosis frequency frames); and (vi) average the high kurtosis frequency frames, on a pixel-by-pixel basis, to produce a frequency image.

As used herein, unless the context clearly indicates otherwise, references (however worded) to measurements of a phenomenon include indirect measurements of the phenomenon. For instance: (a), measurements of electric field strength by a THz-TDS sensor are an indirect measurement of incident light intensity; and thus (b) measured electric field strength (that has been measured by a THz-TDS sensor) is a non-limiting example of measured intensity of incident light.

This invention has many practical applications. Among other things, in illustrative implementations, this invention may be employed to detect content that is printed or written on (or otherwise attached to) occluded layers of a layered object, such as a closed book or layers of paint in a painting. Likewise, in illustrative implementations, this invention may be employed to inspect densely layered samples that occur in industry (e.g. coatings, and polymer-based laminates), geology, and objects of cultural value (e.g. documents and art works).

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show some illustrative implementations of this invention, or provide information that relates to those implementations. The examples shown in the above Figures do not limit this invention. This invention may be implemented in many other ways.

DETAILED DESCRIPTION

Figure 1:
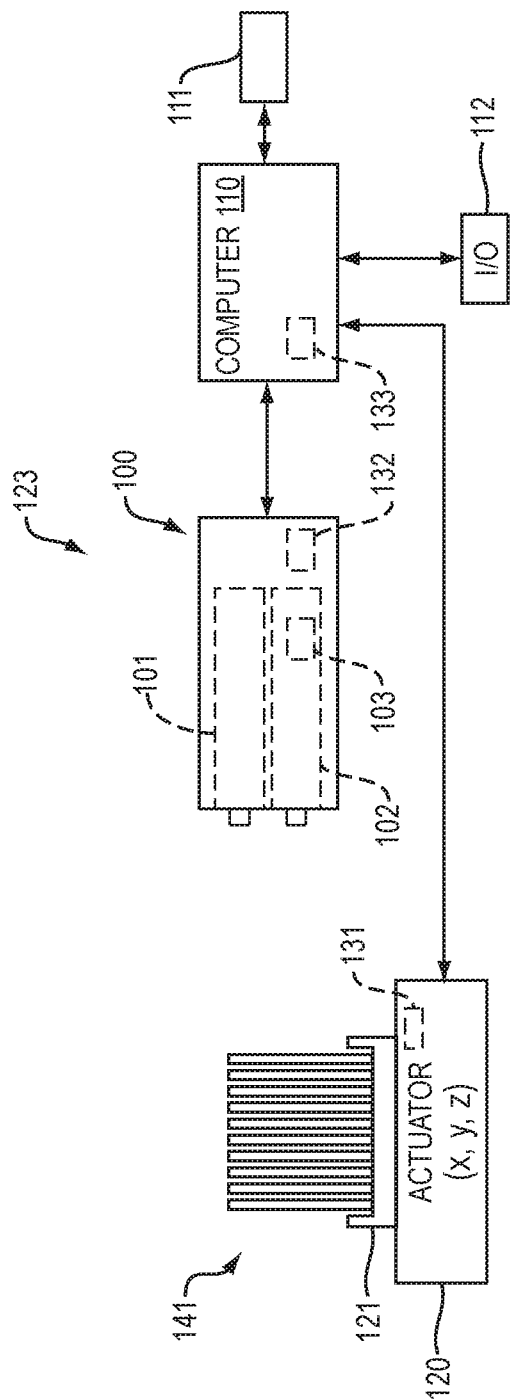
FIG. 1 shows hardware of a system configured to capture images of a layers in a layered object.

FIG. 1 shows hardware of an imaging system that is configured to capture images of a layers in a layered object. In the example shown in FIG. 1, imaging system 123 includes a imaging sensor 102, an active light source 101, an actuator 120, a stage 121, a computer 110, memory device 111, and one or more input/output (I/O) devices 112.

In FIG. 1, imaging sensor 102 and light source 101 may be housed together in housing 100. The imaging sensor 102 may capture, at each pixel, measurements of the intensity and time-of-arrival (or phase) of light incident at the pixel. Imaging sensor 102 may include an ADC 103. Alternatively, in some cases, ADC 103 is housed together with imaging sensor 102 in housing 100, or is housed together with computer 110.

In some implementations, light source 101 is a laser that emits coherent, pulsed laser light. Alternatively, in some implementations, light source 101 emits light that is not pulsed (e.g., continuous-wave light). In some cases: (a) light source 101 emits coherent light; and (b) the distance between the front surface of a layer and the front surface of the next layer (in the layered object) is greater than half the coherency length of the emitted light.

In FIG. 1, a stage 121 is configured to hold a layered object 141 in a constant position relative to stage 121 while object 141 is being imaged. For instance, stage 121 may include one or more devices that exert pressure against, or support, or at least partially surround, layered object 141 in such a way that movement of layered object 141 relative to stage 121 is prevented or constrained.

In FIG. 1, actuator 120 is configured to actuate movement of stage 121 (and thus of layered object 141, while object 141 is held or supported by stage 121) in x, y, and z directions or any combination thereof. For instance, actuator 120 may raster stage 121 (and thus layered object 141) while the ToF sensor is capturing images of the layered object. For example, if the ToF sensor captures x-t images, then actuator 120 may cause stage 121 (and thus layered object 141) to raster to different y positions.

In FIG. 1, computer 110 may interface with, control the operation of, and receive feedback from, light source 101, imaging sensor 102, actuator 120 and one or more I/O devices 112. For instance, if light source 101 emits pulsed light, then computer 110 may control timing of pulses of light emitted by light source 101. Likewise, computer 110 may control rastering by actuator 120. Computer 110 may receive sensor data from imaging sensor 102 and then process the sensor data to produce images of multiple layers in a layered object. Computer 110 may cause data to be stored in, and retrieved from, memory device 111. The one or more I/O devices 112 may comprise any combination of one or more display screens, touch screens, projectors, computer mice, keyboards, microphones, speakers, and haptic transducers. In FIG. 1, computer 110 may communicate via wired connections (or via optical fibers) with one or more other devices (e.g., actuator 120, imaging sensor 102, light source 101). Alternatively, computer 110 may communicate via wireless transmissions with one or more other devices (e.g., actuator 120, imaging sensor 102, light source 101). Wireless modules (e.g., 131, 132, 133) may be employed to transmit and receive these wireless transmissions.

In some implementations, imaging system 123 comprises a ToF imaging system, such as a THz-TDS spectrometer. Any type of THz-TDS spectrometer may be employed, in some implementations of this invention. For example, in some cases, the THz-TDS spectrometer operates in transmission mode or detection mode, and detects returning terahertz radiation by photoconductive antennas or nonlinear crystals.

In illustrative implementations of this invention, the THz-TDS spectrometer may generate terahertz radiation in a variety of different ways. For example, a photoconductive emitter (sometimes called photoconductive switch) may emit pulsed terahertz radiation. The photoconductive emitter may include a laser (e.g., a mode-locked fiber laser, or a Ti-Sapphire laser) and biased antenna electrodes patterned in a semi-conductor material. The laser may emit an ultrashort laser pulse that causes a sudden electric current to flow across these electrodes, which in turn causes a pulse of terahertz radiation to be emitted. Or, for example, the THz-TDS spectrometer may employ optical rectification. In the optical rectification, an ultrashort laser pulse (e.g., emitted by an amplified Ti-Sapphire laser) may pass through a transparent crystal, causing a pulse of terahertz radiation to be emitted.

In illustrative implementations of this invention, the THz-TDS spectrometer may detect a pulse of incident terahertz light (that is returning from the sample being imaged). For example, a detection pulse (which is a portion of the laser pulse that triggered the terahertz radiation) may be steered into a detector. In the detector, the electric field of the terahertz pulse (that reflects from the scene) may interact with the much shorter detection pulse, producing an electrical signal that is proportional to the electric field of the terahertz pulse. By repeating this process (and by using an optical delay line to vary the timing of the detection pulse in different repetitions), different frequencies in the terahertz pulse may be scanned and the electric field of the terahertz pulse as a function of time may be determined. Then a Fourier transform may be performed on this time-domain signal, to calculate a frequency spectrum.

In illustrative implementations of this invention, the THz-TDS spectrometer may detect terahertz radiation (that returns from the sample being imaged) in a variety of different ways. For example, antennas used in photoconductive generation of the terahertz radiation may be employed to detect the returning terahertz radiation, by photoconductive detection. In this approach, the returning terahertz radiation may drive electric current across the antenna leads, and an amplifier may amplify this current. The amplified current may correspond to the field strength of the returning terahertz radiation. Or, for example, the crystals used for optical rectification generation of the terahertz radiation may be employed for detecting the returning terahertz radiation. The crystals may be birefringent in an electric field, causing a change in polarization of the terahertz radiation that is proportional to the electric field strength. This change in polarization may be measured.

In some implementations, the detector of the THz-TDS spectrometer measures incident terahertz light by measuring an electric field. In some implementations: (a) imaging sensor 102 may comprise a detector of a THz-TDS spectrometer; and (b) light source 101 may comprise hardware (in a THz-TDS spectrometer) that emits pulsed radiation in the terahertz frequency range.

Figure 2:
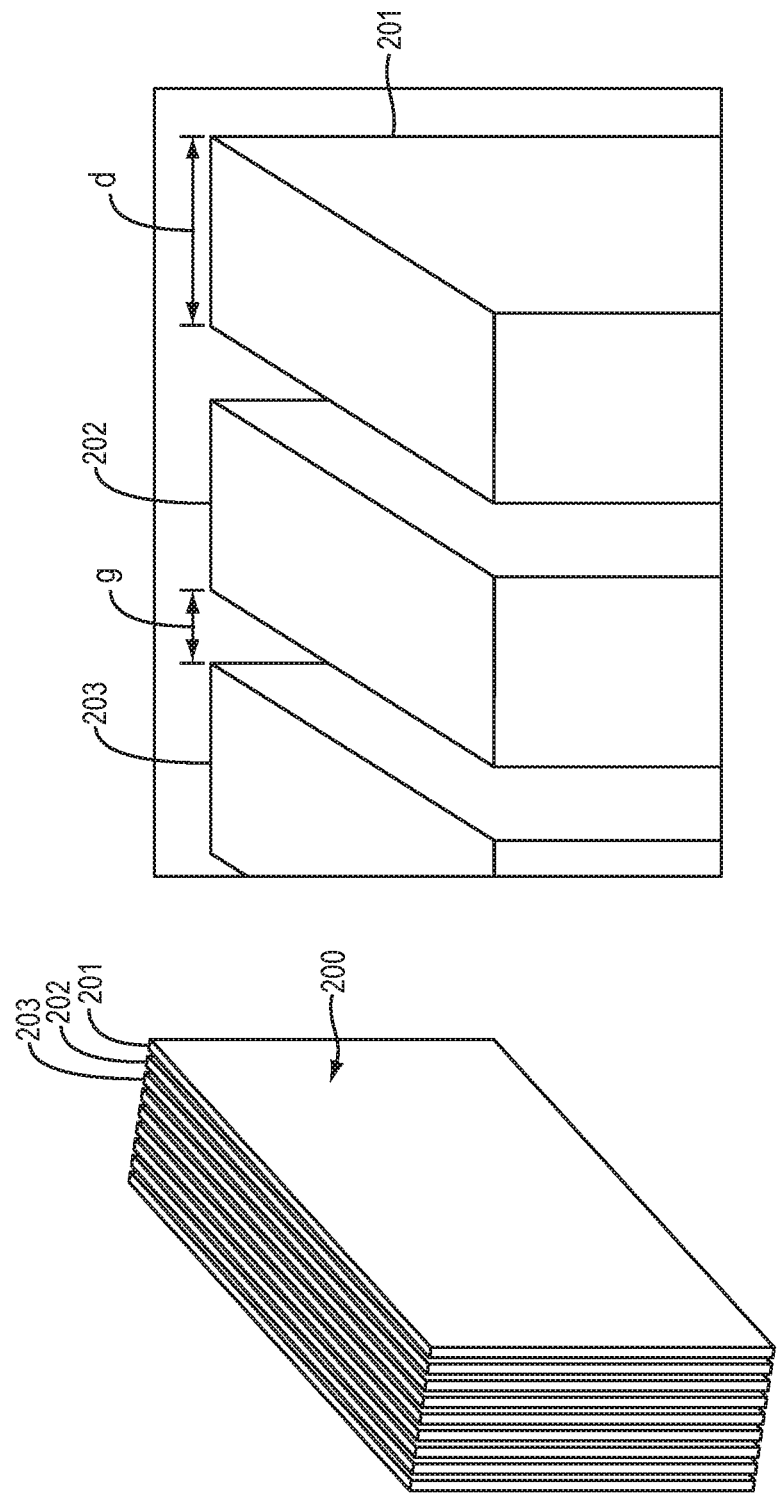
FIG. 2A shows a layered object.
FIG. 2B shows a zoomed, close-up view of layers in a layered object.

FIG. 2A shows a layered object. In the example shown in FIG. 2A, layered object 200 comprises nine layers, including a first layer 201, a second layer 202, and a third layer 203.

FIG. 2B shows a zoomed, close-up view of layers in layered object 200. Specifically, FIG. 2B shows a portion of layer 201, of layer 202, and of layer 203 of layered object 200. In the example shown in FIG. 2B, each layer has a width $d \cong 300$ μm and each gap between two neighboring layers has a distance of $g \cong 20$ μm.

Figure 3:
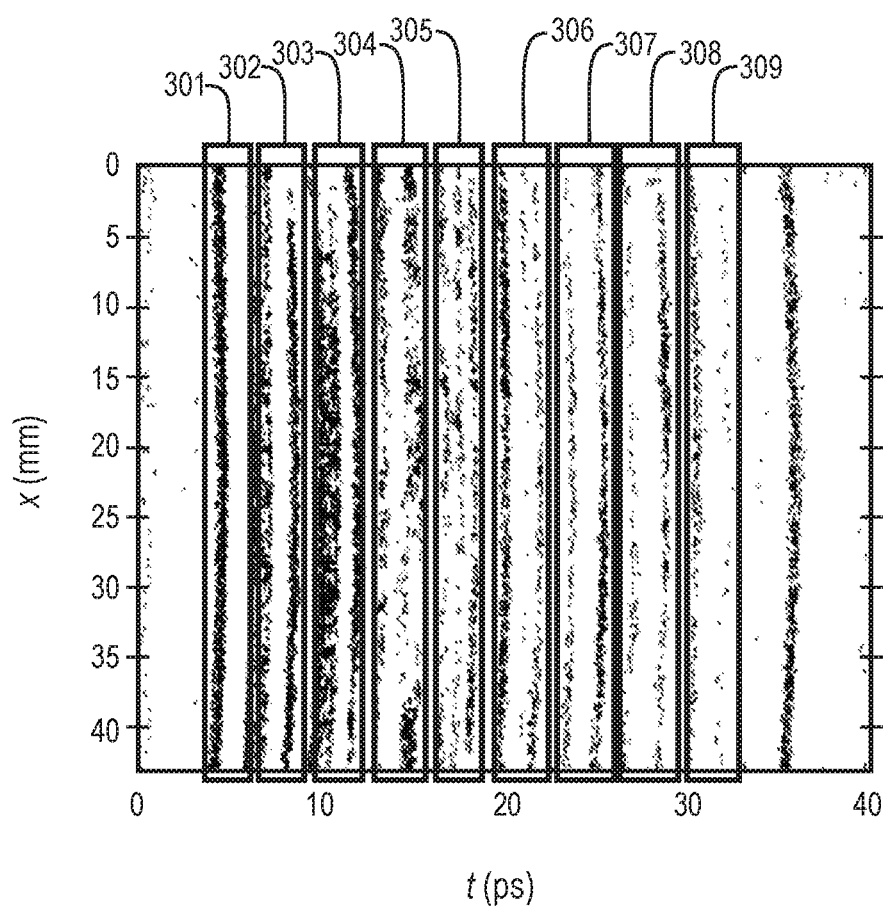
FIG. 3 is an x-t image that shows pulsed reflections from a layered object.

FIG. 3 is an x-t image that shows pulsed reflections from a layered object. As used herein, an "x-t image" means an image that has two coordinate axes wherein: (a) the two coordinate axes are an x-axis and a t-axis; (b) displacement along the t-axis corresponds to displacement in time; and (b) displacement along the x-axis corresponds to displacement along a spatial x axis of an imaging sensor (e.g., a ToF sensor).

In the example shown in FIG. 3, time t is the time-of-arrival of incident light at a ToF sensor. In FIG. 3, time t increases from left to right. Thus, a light pulse recorded on the right side of FIG. 3 arrives at the ToF sensor later than when a light pulse recorded on the left side of FIG. 3 arrives at the ToF sensor.

In FIG. 3, the t-axis (i.e., time-axis) is equivalent to a depth-axis. This is because light reflecting from the layered object arrives at the ToF sensor at different times, depending on the depth of the layer that reflected the light. The later the time-of-arrival, the greater the depth of the layer from which the light reflected. Thus, the further that a given (x, t) point is to the right in FIG. 3, the greater the depth from which light reflected before being incident at the ToF sensor.

In FIG. 3, the t-axis (i.e., time axis) is also equivalent (over an open interval of $2\pi$ radians) to a phase-axis. This is because light reflecting from the layered object has different phases depending on the optical distance that light travels in a round trip from the ToF sensor, to the layered object, and back to the ToF sensor. Put differently, the phase of reflected light that is incident on the ToF sensor depends on the amount of time elapsed while light travels in this round trip.

In FIG. 3, the greater the intensity of reflected light recorded for a given (x, t) point, the darker that the given point appears in FIG. 3.

FIG. 3 shows measurements taken by a ToF sensor while a pulse of emitted light reflects back from multiple different layers in a layered object and arrives at the ToF sensor.

Different regions of FIG. 3 correspond to different layers of the multi-layered object. Specifically, in FIG. 3, regions 301-309 represent intensity of light that reflected from layers 1-9, respectively, of the layered object. That is, regions 301, 302, 303, 304, 305, 306, 307, 308, 309 of FIG. 3 show intensity of light that was incident on the ToF sensor and that reflected from the first layer, second layer, third layer, fourth layer, fifth layer, sixth layer, seventh layer, eighth layer, and ninth layer of the layered object, respectively.

In FIG. 3, each reflected pulse appears as a vertical, thick line comprising numerous dark points. As can be seen in FIG. 3, in almost all layers (e.g., layers 2-9 corresponding to regions 302-309), there are two reflected pulses per layer, one near the front surface of the layer and the other near the rear surface of the layer.

Figure 4:
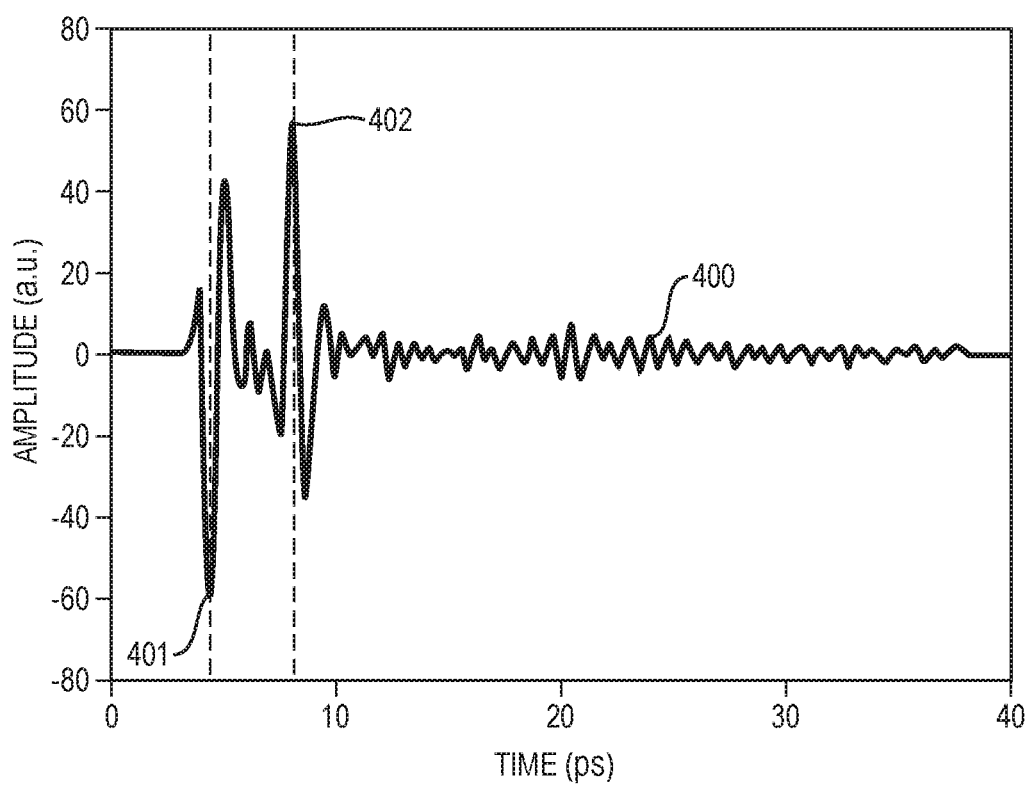
FIG. 4 is a chart that shows peaks in simulated light reflecting from a dielectric slab.

FIG. 4 is a chart that shows peaks in simulated light reflecting from a dielectric slab. Specifically, FIG. 4 shows a simulation of electric field strength measured by a THz-TDS sensor while a pulse of emitted light reflects back from single dielectric slab and arrives at the THz-TDS sensor. (Recall that a THz-TDS sensor may measure electric field strength as an indirect measure of incident light intensity).

In FIG. 4, peaks 401 and 402 are peaks in a time domain signal 500 that encodes simulated measurements of electric field strength over time. These simulated measurements of electric field strength are (in simulation) taken by a THz-TDS sensor and indirectly measure intensity of light which is incident at the THz-TDS sensor after reflecting from the dielectric slab. Peaks 401 and 402 correspond to the two largest impulses of light that reflect from the dielectric slab. These two dominant reflected pulses reflect from a front surface and a rear surface, respectively, of the dielectric slab. In FIG. 4, the peak locations exactly identify the impulse locations because the pulse effective width is sufficiently small and the layer is sufficiently thick.

Peak Detection

In illustrative implementations, a sensor captures measurements, over time, of intensity of light that is incident on the sensor and that has reflected from different layers of a layered object. These measurements are encoded in a digital time-domain signal.

In some cases, the sensor comprises a ToF sensor. For example, in some cases: (a) the ToF sensor comprises a THz-TDS sensor which measures light intensity indirectly by measuring electric field strength; and (b) the time domain signal encodes these indirect measurements of light intensity (i.e., measurements of electric field strength).

In illustrative implementations, peaks in the time-domain signal (which signal encodes measurements of light intensity or electric field strength) are identified. In some use scenarios, for each layer in a set of layers in the multi-layered object: (a) there is only one identified peak per layer; and (b) each identified peak corresponds to at least the front surface of a layer. For example, this may occur where the layers (in the layered object being imaged) are much thicker than the gaps between the layers.

The following nine paragraphs describe a non-limiting example of a peak-finding method that may be employed in this invention. The peak-finding method described in the following nine paragraphs is sometimes referred to herein as "Double Histogram Thresholding and Clustering" or "DHTC".

In DHTC, the probability of each point being an extremal value in the time waveform may be computed. This may be based on the amplitude, first derivative (e.g. speed), and the statistical characteristics of the noise in the waveform. DHTC may recognize extremal values because they are local maxima/minima and their derivative is equal to zero.

Before starting DHTC, the time waveform may be denoised, in an optional pre-processing step. For instance, partial wavelet denoising may be performed. Denoising may be desirable if the time waveform is very noisy.

After this pre-processing step (if any), the DHTC algorithm may compute the time derivative of the waveform, or speed. Then, both the amplitude y and speed $$\frac{dy}{dt}$$

may be normalized with respect to their standard deviations:

$$(y, t) \rightarrow (q, p) = \left(y, \frac{dy}{dt}\right) \rightarrow (u, v) = \left(\frac{q}{\sigma_q}, \frac{p}{\sigma_p}\right). \quad \text{(Equation 1)}$$

where u is normalized amplitude and where v is normalized amplitude (i.e., normalized speed).

In DHTC, a parameter E may be defined for each point in the waveform based on amplitude and speed. This parameter E may be defined in such a way that E is high for higher amplitudes and low velocities. This provides a filtering mechanism to separate signal from noise, retaining only the points that are candidates to be extremal:

$$E = u^2 e^{-v^2}. \quad \text{(Equation 2)}$$

In DHTC, the histograms for the amplitude and speed of a waveform provides a statistical description of the distribution of their values. In many cases: (a) pulses in each emitted light waveform are highly localized in time; (b) most of the content of the waveform is noise; and (c) the histograms mostly describe the statistical characteristics of the noise. In these cases, the peaks of the pulses may tend to be outliers in the histogram of amplitudes but to lie around the zero value in the histogram of velocities. In many cases, histograms have an approximately Gaussian distribution for both the amplitude and speed.

In DHTC, the probability of a point being an extremal point in the time waveform may be computed by using the error function for both the amplitude and speed. Specifically, in DHTC, the likelihood p of a point being an extremal point in the time waveform may be computed as:

$$p(u, v) \to 4\left(\operatorname{erf}(|u|) - \frac{1}{2}\right)\left(\frac{3}{2} - \operatorname{erf}(|v|)\right), \quad \text{(Equation 3)}$$

where "erf" is the single-sided cumulative error function, and u and v are normalized amplitude and speed, respectively.

In DHTC, the calculation of likelihood (in Equation 3) provides a second threshold mechanism to select candidates with the highest likelihood of being extremal values. The result of applying DHTC on a waveform may be a series of candidates that are likely to be extremal values. However, in illustrative implementations, DHTC does not identify which candidate corresponds to a certain peak. Experimental and simulation results indicate that candidates tend to group around a real peak of the pulse. In DHTC, use k-means clustering is employed to group the candidates into the different peaks. The candidates have high likelihood to be the extremum; DHTC chooses the point with highest absolute amplitude inside each cluster as the representation of that peak.

The application of DHTC on an (x, y, t) time-domain data cube provides candidates for extremal values of the temporal waveform. These candidates for extremal values may comprise a point cloud, and clusters in this point cloud may indicate the position of the different layers. Clustering may assign each candidate point into each layer so that a surface representing the layer may be determined.

In illustrative implementations, DHTC outputs times in the time waveform that correspond to peaks in the time waveform. The DHTC output may be employed as an input to spectral analysis (in which kurtosis filtering is used to enhance contrast.)

This invention is not limited to the DHTC method (described in the preceding nine paragraphs). Other methods may be employed to detect peaks, in illustrative implementations of this invention.

For instance, machine learning may be employed to detect peaks. In some case, a parametric model is learned (in supervised machine learning) using labeled peaks. The machine learning may take into account many parameters, including one or more of amplitude, speed (first derivative), peak width, spacing between neighboring peaks, and location of peaks.

Or, for instance, peaks in the time waveform may be identified by employing an edge detection method. The edge detection method may detect edges in a cross-section of an (x, y, t) data cube, where the data cube represents measurements (taken by the ToF sensor) of light intensity (or electric field strength) over time at each pixel (x, y). The cross-section may be taken along the time axis in such a way that different times are shown in the cross-section. A wide variety of edge detection methods may be employed, to detect the edges. For instance, Canny edge detection or Canny-Deriche edge detection may be employed. In some cases, search-based edge detection is employed, in which a first order derivative expression is used to compute gradient magnitude. For example, in some cases, central differences or a Sobel operator may be computed when calculating the first order derivative expression. In some other cases, zero crossings of a second order derivative expression are detected. For example, the zero crossings of the Laplacian or of a non-linear differential expression may be computed, to detect edges.

In illustrative implementations of this invention, peak-finding methods (such as DHTC) may be well-suited for use scenarios in which peaks in the time waveform do not overlap each other or overlap minimally. For example, non-overlapping peaks (or minimally overlapping peaks) may occur where the pulse duty cycle is small (i.e., where pulse duration is much shorter than the time interval between the beginning of two neighboring pulses).

In some implementations, peaks in the time waveform overlap each other and deconvolution is employed to disentangle and identify the peaks.

Kurtosis Filtering in Frequency Domain

In illustrative implementations of this invention, kurtosis filtering is performed in the frequency domain, in order to enhance contrast. For example, the enhanced contrast may increase the contrast between a region of a layer in which content of interest (e.g., a letter or number that is printed or written on the layer) is printed and other regions of the layer in there is no content (e.g., there is no letter or number).

In some implementations, measurements taken by a ToF sensor may be encoded in a data cube d(x, y, z) where x and y are the spatial coordinates and z is the time (convertible to depth). In discrete form, z takes values of $z_1, z_2, \ldots, z_n$, where each $z_i$ corresponds to a certain layer depth. These depths may be found by the DHTC algorithm discussed above. A discrete Fourier transform (DFT) of d(x, y, z) along the z coordinate with a small time window (or depth window) may be calculated. Let $\hat{d}(x, y, \omega)$ be the amplitude of this DFT. The time window (or equivalently depth window) may be very small, such as ~3 ps (or equivalently ~660 μm in depth). The time window (or equivalently depth window) may be centered on, or otherwise include, the time (or depth) of an identified peak, which may correspond to a layer of the layered object being imaged. In some implementations, window size depends on layer thickness and is derived from the average thickness of layers (which may be determined by detecting peaks in the time waveform, as discussed above).

The modulus (absolute value) of the amplitude of the DFT may be computed:

$$f(x,y,\omega)=|\hat{d}(x,y,\omega)|. \quad \text{(Equation 4)}$$

In Equation 6, ω takes k distinct values $\omega_1, \ldots, \omega_k$ because of the discrete nature of the transform.

In order to get clear images of content of each layer (e.g., text written on the front surface of each layer), it is helpful to select frequency bins in which contrast (e.g., between content and no content) is high. Kurtosis information may be employed to select the high contrast images. For a high contrast image that is close to being binary, a histogram of the image may have sharp peaks about the low and high intensity values. Kurtosis may be loosely described as a measure of the peakedness of a probability density function. Thus, selecting frequency images with the highest kurtosis may provide the images of highest contrast.

Kurtosis values for all the frames $f(x, y, \omega_1)$ through $f(x, y, \omega_k)$ may be calculated as $$K_i=\operatorname{Kurt}[f(x,y,\omega_i)] \; i=1, \ldots, k, \quad \text{(Equation 5)}$$

Then frequency frames with the highest kurtosis values may be selected and averaged. Specifically, m' frequency frames that have the highest kurtosis values may be selected. Then these m' frequency frames may be averaged to produce frequency image $I_f(x, y)$. In the preceding expression, "$I_f$" highlights the fact that the image is a frequency image.

Thus, frequency image $I_f(x, y)$ may be produced by taking a DFT of a narrow time window of the time domain signal, then calculating the kurtosis of each frequency frame, then selecting a set of frequency frames that have the highest kurtosis, and then averaging this set of high kurtosis frequency frames.

Thus, in some cases, the spectral analysis may include the following steps:

(a) select a narrow time window based on the time (or equivalently) depth value found by peak detection;

(b) for a set of k frequency frames, calculate $K_1$=Kurt[f(x, y, $\omega_1$)] through $K_k$=Kurt[f(x, y, $\omega_k$)], where Kurt is the kurtosis operator;

(c) sort the $K_1, \ldots, K_k$ in descending order as $K_{p_1}, K_{p_2}, \ldots, K_{p_k}$ (thus, $K_{p_1}$ and $K_{p_k}$ have the highest kurtosis and lowest kurtosis, respectively, in the set of k frequency frames); and (d) calculate frequency image $I_f(x, y)$ as the average of m' frames with highest kurtosis values as below $$I_f(x, y) = \frac{\sum_{i=1}^{m'} f(x, y, \omega_{p_i})}{m'} \quad \text{(Equation 6)}$$

In the spectral analysis described in the preceding twelve paragraphs: (a) the DFT is only taken along the depth coordinate axis (z-axis) or equivalently the time coordinate axis (t-axis); and (b) thus, the frequency values may be correlated to the absorption lines of materials in the content region of a layer and in the non-content region of a layer. (For instance, in some cases, the content region of a layer comprises ink and the non-content region of a layer comprises paper). The kurtosis may be applied to a vectorized version of f(x, y, $\omega_i$), which is a 2D image for a given frequency $\omega_i$.

Compared to averaging along all the frequency frames or using a single frequency frame, kurtosis filtering in the frequency domain (as described above) improves signal to noise ratio and avoids unwanted noise from higher frequencies.

Computer Vision

In some implementations, after a frequency image $I_f(x, y)$ is computed, computer vision (e.g., optical character recognition) is performed to recognize content in the frequency image. For instance, the computer vision may recognize one or more text characters or words that are written or printed on a surface shown in the frequency image.

In some implementations, optical character recognition (OCR) is performed to recognize text in the content of a frequency image. For example, the OCR may recognize letters or numbers that are written on the front surface of a layer of a layered object and that are captured in a frequency image.

The OCR may include one or more of the following pre-processing steps: (a) de-skew (rotate image until lines of text are perfectly horizontal or vertical); (b) despeckle; (c) binarize (convert from grayscale or color to black-and-white); (d) line removal (remove lines without text); (d) analyze layout (identify columns, paragraphs, captions); (e) detect words (detect a word, before recognizing which specific word it is); (f) recognize script (e.g., determine language(s) in which text is written); (g) detect character (detect a text character, before recognizing which specific text character it is); and normalize (normalize aspect ratio and scale).

The OCR may involve matrix matching (or pattern recognition), in which the frequency image is compared, on a pixel-by-pixel basis, to a stored image of a text character (e.g. letter or number). Alternatively or in addition, the OCR may involve extracting features of text (such as lines, loops, and line intersections) from the frequency image, creating a vector that is an abstract representation of the extracted features, and comparing this vector to a stored vector that is an abstract representation of features of known text. Alternatively or in addition, the OCR may involve adaptive recognition. Specifically, the OCR may involve two passes, in such a way that some text characters are recognized with high confidence in the first pass, and these recognized characters are used in the second pass to more accurately recognize the remaining text characters. In some cases, accuracy of the OCR is increased by employing a lexicon or dictionary. The lexicon or dictionary may comprise a list of text characters or words that are the only characters or words that the OCR is permitted to recognize. Using a lexicon or dictionary may be particularly useful if there is prior knowledge regarding the type of content that is being imaged. In some cases, accuracy of the OCR is enhanced by using near-neighbor analysis to correct errors (based on the fact that certain text characters or words are often seen next to each other).

In some implementations, text recognition is performed to recognize text content that is printed or written on a layer that is shown in a frequency image. The text recognition may include localization (e.g., detecting candidate text regions); verification (analyzing candidate regions to detect text and non-text regions); segmentation (separating the text regions into image blocks that contain characters); and recognition (converting the image blocks into characters). In some cases, a localization step (detecting candidate text regions) may be performed by CCA (connected component analysis) or sliding window classification. The candidate text regions may be recognized based on features such as color, edges, gradients, texture, and stroke width. In some cases, a verification step (analyzing candidate regions to detect text and non-text regions) employs knowledge-based methods or feature discrimination. In some cases, segmentation may involve text binarization, adaptive thresholding, text-line-segmentation (separating a region of multiple text lines into multiple regions, each of which is a separate, single text line) and character segmentation (separating a text region into multiple regions, each of which is a single character). In some cases, only a single type of font is recognized by employing LDA (linear discriminant analysis) or analyzing general features such as Gabor feature analysis. In some cases, where the text in question has a font that is unknown in advance or has multiple known fonts, text may be recognized by employing unsupervised learning, representative learning, an SVM (support vector machine), discriminative feature pooling, image rectification, or deformable models.

The following eleven paragraphs describe an OCR method that is employed to detect content in a frequency image, in a prototype of this invention.

In this prototype OCR method, regions of relatively high intensity are matched against combinations of shapes (e.g., letter templates) at different locations and orientations. This is formulated as an optimization problem; each possible combination of shapes has an associated energy which scores its match to the image, and the algorithm searches over all such possibilities to maximize this score. This search is made computationally tractable by relaxing the combinatorial search into a convex program that may be solved with standard optimization software.

In this prototype OCR method, for a given shape S, the corresponding characteristic function, denoted by $\chi_S(x)$, is a function that takes unit values over the points $x \in S$ and vanishes elsewhere. A convex relaxation may be computed as the minimization $$\min_\alpha \int_\mathcal{D} \max(\Delta(x)\mathcal{L}_\alpha, \Delta(x)^-) dx \text{ s.t. } \|\alpha\|_1 \leq \tau, \quad \text{(Equation 7)}$$

where (1) $\mathcal{D}$ is the domain of imaging, (2) $\mathcal{L}_\alpha(x) = \Sigma_{j=1}^n \alpha_j \chi_{S_j}(x)$, (3) the $l_1$ penalty $\|\alpha\|_1$ is simply $\Sigma_{j=1}^n |\alpha_j|$, (4) the quantity $\Delta^-$ takes the value of $\Delta$ when $\Delta < 0$ and vanishes otherwise, (5) $\alpha$ is the contribution coefficient and $\tau$ is a prior guess of number of characters to be recovered in the volume.

In this prototype OCR method, in some use scenarios: (a) a dictionary has many potential shapes; and (b) only a combination of few of these potential images appears in the frequency image. The prototype OCR method returns values for the $\alpha$ parameters. The nonzero values of $\alpha$ correspond to active shapes (shapes that appear in the image), and the zero values of $\alpha$ correspond to the inactive shapes, i.e., those that are in the dictionary but have no contribution to the image.

In this prototype OCR method, the value of $\tau$ represents a prior guess about the number of shapes in the image.

Here is a non-limiting example of the prototype OCR method. In this example, an image shows the word "CAR". In this example, the goal is to identify the characters in the image. In this example, a large dictionary of letters may be created as follows: AAAAAAAABBBBBBBBC-CCCCCCCDDDDDDDDEEEEEEEEFFFFFFFF . . . YYYYYYYYZZZZZZZZ In this example, the reason there are multiple versions of each letter in the dictionary is to have different versions of each letter at different locations in the image. In this example, let the number of characters above (i.e., the number of dictionary elements) be 208. In this example, when the prototype OCR program is run for $\tau=3$: (a) the entries of vector $\alpha$ may be computed as: 000100000001000000010000000000000000000 . . . 000000000000; (b) 205 contribution coefficients would be zero; and (c) only 3 contribution coefficients would be nonzero and they would correspond to the letters C, A and R. In this example: (a) the dictionary includes six entries for "C", each for a different potential position of "C" in the image; and (b) only one of the contribution coefficients for "C" is "1", corresponding to the position closest to where the actual letter "C" is in the image.

In this prototype OCR method, the active $\alpha_j$ values identify the active shapes in the composition and their sign determines the index set ($I_\oplus$ or $I_\ominus$) they belong to. (The sets $I_\oplus$ and $I_\ominus$ index the shapes being added and removed, respectively.) In Equation 7, the $l_1$ constraint is used to control the number of active shapes in the final representation. In Equation 7, $\tau$ often takes integer values.

In this prototype OCR method, a dictionary of English characters is employed to match a text character in each layer of the layered object with an element of the dictionary.

In some use scenarios in which this prototype OCR method is employed: (a) each layer in the layered object being imaged contains a single character (placed on the left, center or the right portion of the frequency image); (b) to reduce computational load, the character recognition is performed in a loose window placed about the possible location of the character; (c) the possible loose x-y window is localized based on signal level in the frequency image; and (d) to build up the shape dictionary, stacks of 26 uppercase letters are placed at 9 different pivot points within the designated window.

In some use scenarios in which this prototype OCR method is employed, the values $u_{in}$ and $u_{ex}$ are taken to be the 15% and 85% quantiles of the intensity values within each layer (where $u_{in}$ is a constant value around which intensity tends to cluster for pixels inside a text character, and where $u_{ex}$ is a constant value around which intensity tends to cluster for pixels outside a text character).

In this prototype OCR method, to eliminate the low frequency artifacts present in deep layers of the layered object (e.g., layers 6 to 9), high pass filtering is performed to generate more homogenous images. In experiments that employed this prototype OCR: (a) the minimization set forth in Equation 7 was performed on each image with $\tau=1$; and (b) text characters on multiple, occluded layers of a layered object were accurately recognized.

The prototype OCR method described in the preceding eleven paragraphs is a non-limiting example of this invention. This invention may be implemented in other ways. For instance, other computer vision methods (including OCR methods) may be used.

In some implementations, OCR is performed in regions of a frequency image in which signal intensity is lowest (e.g., corresponding to where there is dark ink on the layer of the layered object being imaged). Alternatively, once a first text character (e.g., letter) is recognized, the regions of interest in which OCR is performed next may be predicted based on knowledge of likely size of letters and likely size of gaps between letters.

Imaging Methods

Figure 5:
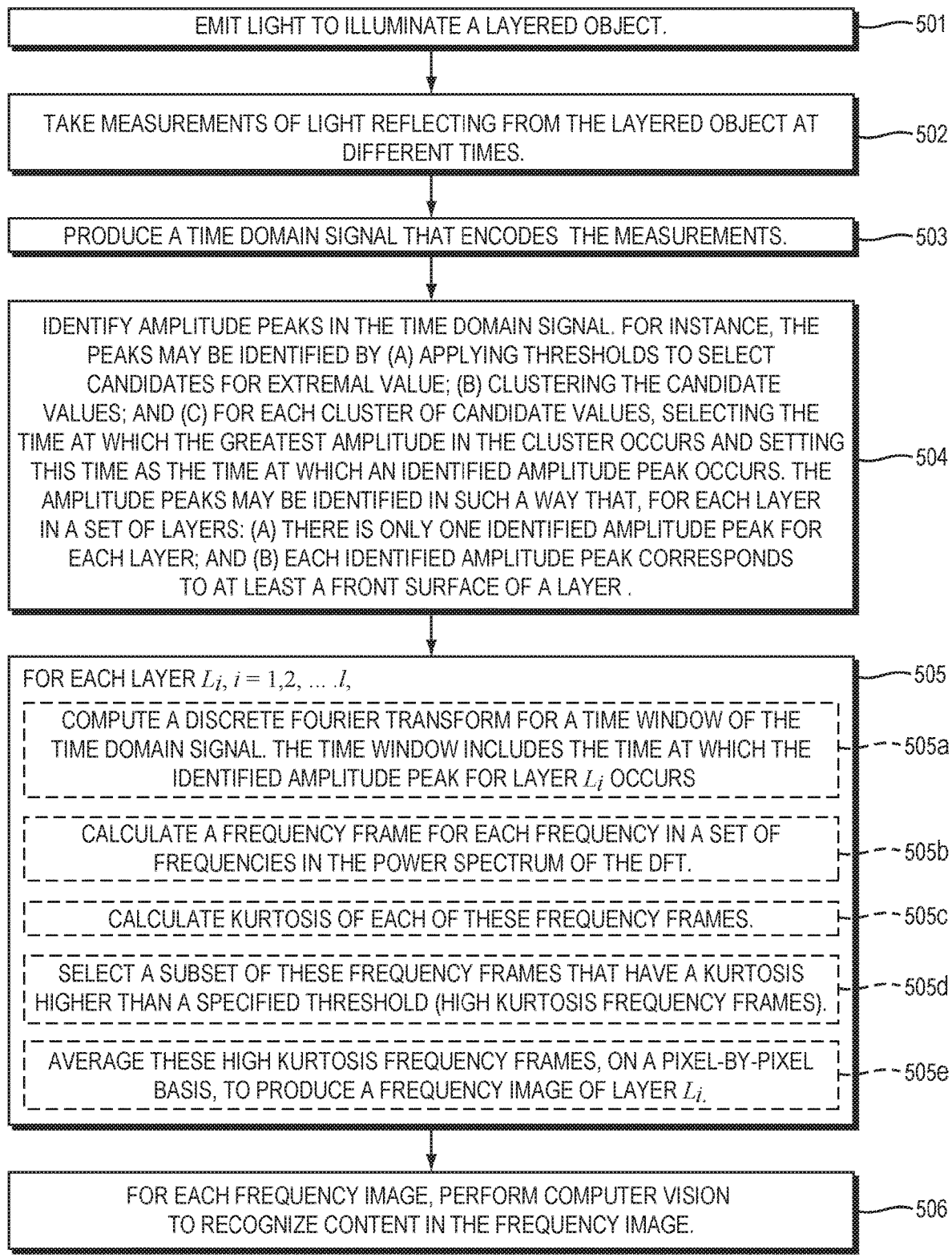
FIG. 5 is a flowchart for a method of imaging layers of a layered object.

FIG. 5 is a flowchart for a method of imaging layers of a layered object. In the example shown in FIG. 5, the method includes at least the following steps: Emit light to illuminate a layered object (Step 501). Take measurements of light reflecting from the layered object at different times (Step 502). Produce a time domain signal that encodes the measurements (Step 503). Identify amplitude peaks in the time domain signal. For instance, the peaks may be identified by (a) applying thresholds to select candidates for extremal value; (b) clustering the candidate values; and (c) for each cluster of candidate values, selecting the time at which the greatest amplitude in the cluster occurs and setting this time as the time at which an identified amplitude peak occurs. The amplitude peaks may be identified in such a way that, for a set of layers in the layered object: (a) there is only one identified amplitude peak for each layer; and (b) each identified amplitude peak corresponds to at least a front surface of a layer (Step 504). For each layer $L_i$, i=1, 2, . . . l, (A) compute a discrete Fourier transform for a time window of the time domain signal; the time window includes the time at which the identified amplitude peak for layer $L_i$ occurs (step 505a); (b) calculate a frequency frame for each frequency in a set of frequencies in the power spectrum of the DFT (step 505b); (c) calculate kurtosis of each of these frequency frames (step 505c); (d) select a subset of these frequency frames that have a kurtosis higher than a specified threshold (high kurtosis frequency frames) (step 505d); (e) average these high kurtosis frequency frames, on a pixel-by-pixel basis, to produce a frequency image of layer $L_i$ (step 505e). (collectively, Step 505). For each frequency image, perform computer vision (e.g., OCR) to recognize content in the frequency image (Step 506). In the method shown in FIG. 5, the computations in Step 505: (a) are performed separately for each frequency image; and (b) thus are performed separately for each layer in a set of layers, if there is one frequency image for each layer in the set. Steps 505a-505e may be repeated until a frequency image has been produced for each layer.

Figure 6:
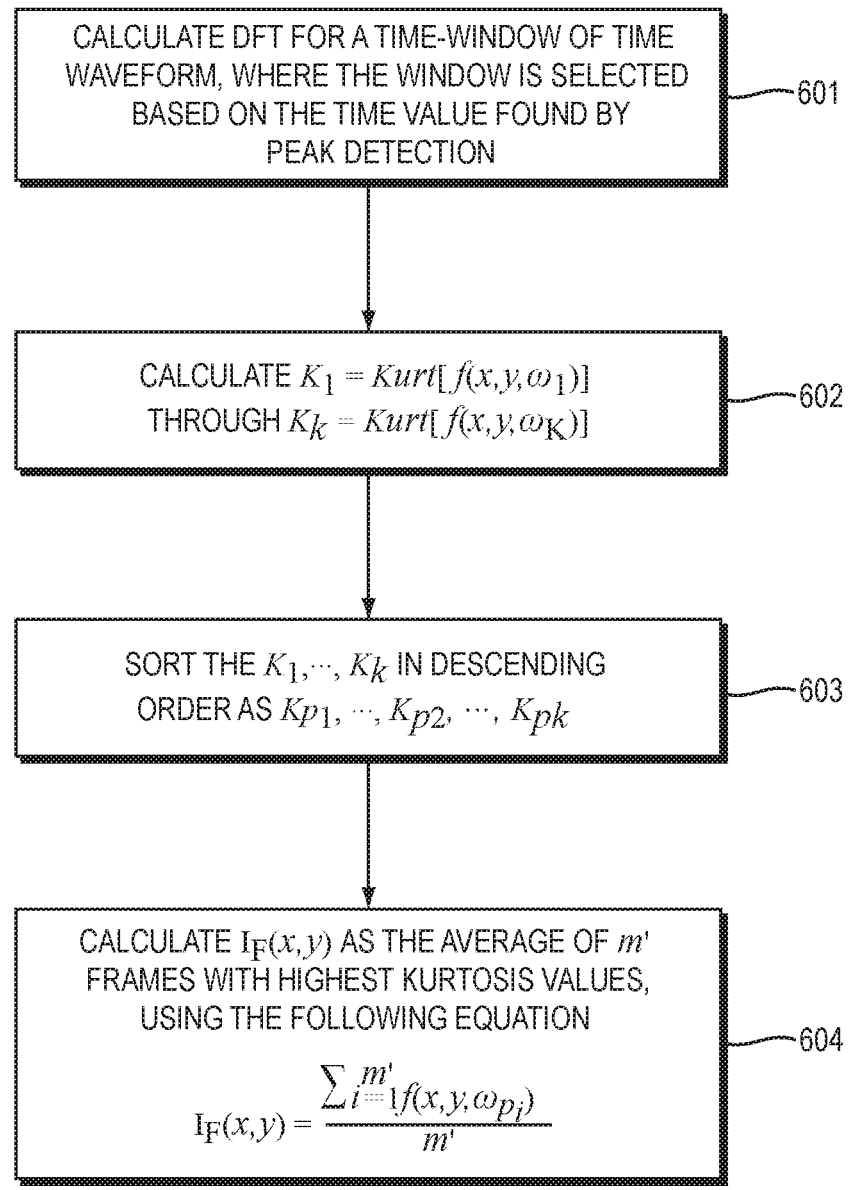
FIG. 6 is a flowchart for a method of kurtosis filtering.

FIG. 6 is a flowchart for a method of kurtosis filtering. In the example shown in Figure, the method includes at least the following steps: Calculate DFT (discrete Fourier transform) for a time window of a time waveform, where the window is selected based on the time value found by found by peak detection (Step 601). Calculate $K_1=\text{Kurt}[f(x, y, \omega_1)]$ through $K_k=\text{Kurt}[f(x, y, \omega_k)]$ (Step 602). Sort the $K_1, \ldots, K_k$ in descending order as $K_{p_1}, K_{p_2}, \ldots, K_{p_k}$ (Step 603). Calculate $I_f(x, y)$ as the average of m' frames with highest kurtosis values, using the following equation $$I_f(x, y) = \frac{\sum_{i=1}^{m'} f(x, y, \omega_{p_i})}{m'}$$

(Step 604).

THz-TDS Implementations

In some implementations of this invention, the ToF sensor comprises a THz-TDS (terahertz time-domain spectroscopy) sensor.

In some implementations of this invention: (a) a THz-TDS sensor achieves sub-picosecond time resolution and spectral resolution; and (b) this time resolution and spectral resolution are exploited to computationally recognize occluded content in layers whose thicknesses are greater than half of (and less than two times) the illumination wavelength. This THz-TDS imaging method may use statistics of the THz electric-field at subwavelength gaps to lock into each layer position and then use spectral kurtosis (for a narrow time window that corresponds to a specific layer) to tune to highest spectral contrast of the content on that specific layer. In a prototype of this invention which employed THz-TDS, occluding textual content was successfully extracted from a packed stack of paper pages without human supervision. In some cases, this THz-TDS imaging method provides over an order of magnitude enhancement in the signal contrast and may be employed to inspect structural defects in wooden objects, plastic components, composites; drugs, and to inspect cultural artifacts with subwavelength or wavelength comparable layers.

The following six paragraphs describe a prototype of this invention, in which the ToF sensor comprises a THz-TDS sensor.

In this prototype (which employs a THz-TDS sensor), data is acquired with a FICO THz time-domain system manufactured by Zomega Terahertz Corporation. The system has a bandwidth of 2 THz and time delay range of 100 ps. The FICO generates THz pulses via a photoconductive antenna pumped by a femtosecond laser. Electro-optic sampling and balanced detection are used for THz detection. A pump-probe approach with a mechanical delay allows recording the shape of the THz pulse in the time-domain (reflected power is in the tens of nW range). The THz beam is focused on the sample with 25.4 mm focal lens and 1 inch diameter polymethylpentene plastic lens. The sample is mounted on a XY motorized stage so that an image can be acquired by raster scanning. Imaging area is 20 mm×44 mm and step size is 0.25 mm. The system offers a dynamic range of 65 dB in power.

In this prototype (which employs a THz-TDS sensor), a data cube captured by the system may be processed using MATLAB software. In some cases: (a) processing the data cube includes the application of DHTC and k-means clustering for peak detection (as described above), and OCR that employs convex optimization per Equation 13; and (b) this processing takes a few seconds to complete. Alternatively, in some cases, an alternating direction method of multipliers (ADMM) or projected sub-gradient method may be employed in the convex optimization method. Or the convex optimization method described above may be reformulated as a linear program by increasing the number of optimization variables, to make computations more efficient and quicker.

In this prototype (which employs a THz-TDS sensor), the optical setup has a confocal geometry and the sample is rastered. For each spatial point a THz time-domain measurement records the reflections of the electric field from the layered sample with 40 fs time resolution. Reflection geometry provides ToF information for each reflection that is generated from each layer. Therefore, indexing the pulses in time provides a direct measurement of the position of the different layers within a sample.

In this prototype (which employs a THz-TDS sensor), the kurtosis filtering is performed in the frequency domain and uses a thin time slice (~3 ps) of the waveform around the position of the layers (determined by peak detection) to compute the Fourier transform. This operation introduces some higher frequency artifacts, but as a tradeoff the gain in the contrast is significantly better (over an order of magnitude) than a simple amplitude mapping of the waveform. Furthermore, the kurtosis of the histograms of the resulting images in the frequency-domain provides a mechanism to select the frames with the highest contrast between the paper and the content material. In some use scenarios, the kurtosis is induced by the presence of two distinct reflective materials on each layer: the higher the contrast between blank paper and paper with ink in a certain frequency, the higher the kurtosis.

In this prototype (which employs a THz-TDS sensor): (a) data is windowed in time to filter out unwanted contribution from other layers; and (b) signal power is increased by tuning into frequency frames that provide the highest contrast between the two materials.

In this prototype (which employs a THz-TDS sensor), the frequency separation between the frequency frames is 25 GHz. The frequency resolution is inverse of the window size, so the wider the window in the time-domain, the higher the frequency resolution. In this prototype, a 139-point DFT (Discrete Fourier Transform) is employed. A search for the high contrast images is performed between the first 20 low frequency images and then the top three images with the highest kurtosis are selected (m'=3). Averaging among the selected images provides us with a representative image associated with each layer.

The prototype described in the preceding six paragraphs is a non-limiting example of this invention. This invention may be implemented in many other ways.

Software

In the Computer Program Listing above, nineteen computer program files are listed. These nineteen computer program files comprise software employed in a prototype implementation of this invention. To run these as Matlab™ software files, the filename extension for each would be changed from ".txt" to a ".m" filename extension. Here is a description of these nineteen computer program files:

ADHTC.txt calculates the probability of the points being an extremum of the electric field. it gives out confidence levels on negative peak, positive peak and zero crossing.

ADHTCImage.txt applies the ADHTC analysis to time-domain image x.

ClusterADHTC.txt clusters peaks identified by the ADHTC function.

CutoffDelayADHTC.txt computes cutoff delay for ADHTC data (finds the windows).

FitLayersVolume.txt fits layer into the points found in the volume to define the surface of each layer.

GenerateXImages.txt generates a sequence of images.

There are nine software files whose file names start with "LAYER". Each recovers an image of a layer (e.g., an image of a letter on a page) from preprocessed data. Specifically: LAYER1_recovery.txt recovers an image of a first layer. LAYER2_recovery.txt recovers an image of a second layer. LAYER3_recovery.txt recovers an image of a third layer. LAYER4_recovery.txt recovers an image of a fourth layer. LAYER5_recovery.txt recovers an image of a fifth layer. LAYER6_recovery.txt recovers an image of a sixth layer. LAYER7_recovery.txt recovers an image of a seventh layer. LAYER8_recovery.txt recovers an image of an eighth layer. LAYER9_recovery.txt recovers an image of a ninth layer.

IdentityLayer.txt identifies different layers within thickness d.

MapLayersIntensity.txt maps intensities on identified layers.

PlotPosNegAddImages.txt plots images resulting from ADHTC analysis.

preProcess.txt performs kurtosis averaging to improve contrast.

This invention is not limited to the software set forth in these nineteen computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an imaging device, including a light source and a sensor (e.g., a ToF sensor); (2) to identify peaks in a time-domain signal that encodes measurements taken by the imaging device over a period of time; (3) to select a time window of a time-domain signal, which time window includes a time at which an identified peak occurs; (4) to calculate a DFT of the time-domain signal in the time window; (5) to calculate kurtosis of a set of frequency frames, each frequency frame being at a different frequency in the power spectrum of the DFT; (6) to select a set of high kurtosis frequency frames, the kurtosis of each of which exceeds a threshold; (7) to average the high kurtosis frequency frames to compute a frequency image that corresponds to an identified peak; (8) to perform machine vision (e.g., OCR) to recognize content (e.g., letters or numbers) in a frequency image; (9) to receive data from, control, or interface with one or more sensors; (10) to perform any other calculation, computation, program, algorithm, or computer function described or implied herein; (11) to receive signals indicative of human input; (12) to output signals for controlling transducers for outputting information in human perceivable format; (13) to process data, to perform computations, and to execute any algorithm or software; and (14) to control the read or write of data to and from memory devices (tasks 1-14 of this sentence referred to herein as the "Computer Tasks"). The one or more computers (e.g. 110) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 101, 102, 103, 110, 120) are configured for wireless or wired communication with other devices in a network.

For example, in some cases, one or more of these electronic devices each include a wireless module for wireless communication with other devices in a network. Each wireless module (e.g., 131, 132, 133) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 110) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To "average" means to compute an arithmetic mean.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

To say that X is "derived from" Y means that X is computed based on Y.

For an event to occur "during" a time period, it is not necessary that the event occur throughout the entire time period. For example, an event that occurs during only a portion of a given time period occurs "during" the given time period.

The term "e.g." means for example.

Each equation above is referred to herein by the equation number set forth to the right of the equation. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

"Euler's number" means the unique number whose natural logarithm is equal to one. Euler's number is a constant that is approximately equal to 2.71828.

The fact that an "example" or multiple examples of something are given does not imply that they are the only instances of that thing. An example (or a group of examples) is merely a non-exhaustive and non-limiting illustration.

A non-limiting example of calculating a "first derivative" is calculating a finite difference approximation of the first derivative.

"Frequency frame" is defined above.

"Frequency image" is defined above.

"Infrared spectrum" means less than or equal to 430 THz and greater than or equal to 10 THz.

"For instance" means for example.

In the context of an imaging system that captures an image of a scene: (a) to say that B is in "front" of C means that B is optically closer to the scene than C is; and (b) to say that B is "behind" (or in the "rear" of) C means that B is optically farther from the scene than C is.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

An "image of" X means an image that captures at least X.

A time-of-flight imaging system is a non-limiting example of an "imaging system". A time-of-flight sensor is a non-limiting example of an "imaging sensor".

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any measure of intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, luminance or luminous intensity.

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

As used herein, (i) a single scalar is not a "matrix", and (ii) one or more entries, all of which are zero (i.e., a so-called null matrix), is not a "matrix".

Non-limiting examples of "measure of central tendency" are: (a) arithmetic mean, (b) median, and (c) mode (i.e., most frequent value in data set).

Unless the context clearly indicates otherwise, "modulus" means absolute value.

To say that a layer is "occluded, in the visible spectrum, from direct view of a sensor" means that an object which is opaque in the visible spectrum: (i) is positioned optically between the layer and the sensor; and (ii) prevents light in the visible spectrum from traveling from the layer to the sensor.

To say that B is "optically closer" to a scene than C is, means that the optical distance between B and the scene is less than the optical distance between C and the scene.

To say that B is "optically farther" from a scene than C is, means that the optical distance between B and the scene is more than the optical distance between C and the scene.

To say that a layer is "opaque in the visible spectrum" means that the layer is opaque to light in the visible spectrum.

"Optical spectrum" means less than 30 PHz and greater than or equal to 300 GHz.

The term "or" is inclusive, not exclusive. For example, A or B is true if A is true, or B is true, or both A and B are true. Also, for example, a calculation of A or B means a calculation of A, or a calculation of B, or a calculation of A and B. Also, for example, one recognizes content in a first, second "or" third layer if one recognizes content in any combination of one or more of the first, second and third layers.

A parenthesis is simply to make text easier to read, by indicating a grouping of words. A parenthesis does not mean that the parenthetical material is optional or may be ignored.

To say that light has "reflected from a first layer, a second layer and a third layer" means that a portion of the light has reflected from the first layer, a portion of the light has reflected from the second layer, and a portion of the light has reflected from the third layer.

To "set" X to be Y means to assign the value of Y to X. Thus, setting X to be Y may change the value of X, but does not change the value of Y.

As used herein, the noun "set" does not include a group with no elements.

"Single-sided cumulative function" means a cumulative error function in which the lower bound of integration is zero, that is $$\text{erf}(x) = \frac{1}{\sqrt{\pi}} \int_0^x e^{-t^2} dt.$$

Unless the context clearly indicates otherwise, "some" means one or more.

As used herein, a "subset" of a set consists of less than all of the elements of the set.

The term "such as" means for example.

"Terahertz light" means light in the terahertz spectrum.

"Terahertz spectrum" means less than or equal to 10 THz and greater than or equal to 0.05 THz.

"Text character means a letter, number or punctuation mark.

"THz-TDS" means terahertz time-domain spectroscopy.

"Time-domain signal" means a signal, the domain of which is time.

"Time-of-flight sensor" or "ToF sensor" means a sensor that measures scene depth or optical path: (a) by measuring time-of-arrival of light that travels from the ToF sensor to a scene and reflects back to the ToF sensor; or (b) by measuring phase of light that travels from the ToF sensor to a scene and reflects back to the ToF sensor.

To calculate a DFT of a digital time-domain signal "in a time window" means to calculate the DFT of the portion of the signal for which time is within the time window. As a non-limiting example, if a specific time window is 9 ps<t<12 ps, then calculating the DFT of a digital time-domain signal f[t] in the specific time window means to calculate the DFT of the portion of the signal for which 9 ps<t<12 ps. Also, another non-limiting example of calculating a DFT of a digital time domain signal "in a time window" is calculating the DFT of a vector, which vector comprises all discrete points in the digital time-domain signal that occur in the time window.

To say that a machine-readable medium is "transitory" means that the medium is a transitory signal, such as an electromagnetic wave.

A matrix may be indicated by a bold capital letter (e.g., D). A vector may be indicated by a bold lower case letter (e.g., α). However, the absence of these indicators does not indicate that something is not a matrix or not a vector.

"Ultraviolet spectrum" means less than or equal to 30 PHz and greater than or equal to 790 THz.

"Visible spectrum" means less than 790 THz and greater than 430 THz.

"x-t image" is defined above.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) illuminating with terahertz light an object that includes at least a first layer, a second layer and a third layer, the first, second and third layers being opaque in the visible spectrum and being occluded, in the visible spectrum, from direct view of a sensor; (b) taking, at different times, measurements of terahertz light that has reflected from the first, second and third layers and is incident on the sensor, each measurement being a measurement of strength of an electric field at a pixel of the sensor at a particular time, the electric field being a function of intensity of incident terahertz light; (c) identifying peaks in amplitude of a digital time-domain signal, which signal encodes the measurements; and (d) for each particular identified peak (i) selecting a time window that includes a time at which the particular identified peak occurs, (ii) calculating a discrete Fourier transform (DFT) of the time-domain signal in the time window, (iii) calculating a set of frequency frames, in such a way that each particular frequency frame in the set is calculated for a particular frequency in the amplitude spectrum of the DFT, which particular frequency is different than that of any other frequency frame in the set, (iv) calculating kurtosis of each frequency frame in the set, (v) selecting a subset of the frequency frames, in such a way that kurtosis of each frequency frame in the subset exceeds a specified threshold, and (vi) averaging the subset of frequency frames, on a pixel-by-pixel basis, to produce a frequency image for that particular identified peak; wherein the method produces at least a first frequency image of the first layer, a second frequency image of the second layer, and a third frequency image of the third layer. In some cases, the method includes calculating, for each specific pixel in each specific frequency frame, a value that is equal to, or derived from, modulus of the amplitude spectrum of the DFT at the specific pixel at a specific frequency, which specific frequency is identical for all pixels in the specific frequency frame. In some cases, the method includes recognizing one or more text characters in a frequency image. In some cases, the method includes: (a) recognizing, in the first frequency image, content that is printed or written on the first layer of the object; (b) recognizing, in the second frequency image, content that is printed or written on the second layer of the object; or (c) recognizing, in the third frequency image, content that is printed or written on the third layer of the object. In some cases, the method includes calculating a set of frequency images that includes a frequency image for each layer in a set of layers in the object. In some cases, the identifying peaks includes identifying measurements for which a parameter exceeds a threshold, which parameter is defined in such a way that (i) increasing amplitude of the time-domain signal increases the parameter and (ii) decreasing first derivative of the time-domain signal increases the parameter. In some cases, the identifying peaks includes identifying each specific measurement that has a statistical parameter which exceeds a threshold, which statistic parameter is a likelihood that the specific measurement is a local maximum of the time-domain signal. In some cases, the identifying peaks includes: (a) identifying measurements that are each a candidate for being a peak; (b) calculating clusters of the candidates; and (c) for each specific cluster, (i) selecting a specific measurement in the specific cluster, which specific measurement is of a measured incident light intensity that is equal to the largest measured incident light intensity for the specific cluster; and (ii) setting time at which a peak occurred to be time at which the specific measurement occurred. In some cases, the identifying peaks includes: (a) calculating, for each measurement in the time-domain signal, parameter $E=u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal; (b) calculating, for each measurement in the time-domain signal, likelihood $$p = 4\left(\mathrm{erf}(|u|) - \frac{1}{2}\right)\left(\frac{3}{2} - \mathrm{erf}(|v|)\right),$$

where erf is the single-sided cumulative error function; (c) selecting candidate measurements, the candidate measurements being measurements for which parameter E exceeds a first threshold and likelihood p exceeds a second threshold; (d) performing k-means clustering to identify a set of clusters of the candidate measurements; (e) for each particular cluster in the set of clusters (i) identifying a particular time at which a global maximum of amplitude of measured light intensity for the particular cluster occurs, and (ii) calculating a specific time at which a peak occurs, by setting the specific time to be the particular time at which the global maximum occurs. Each of the cases described above in this paragraph is an example of the method described in the first sentence of this paragraph, and is also an example of an embodiment of this invention that may be combined with other embodiments of this invention.

In some implementations, this invention is a method comprising: (a) illuminating with infrared or ultraviolet light an object that includes at least a first layer, a second layer and a third layer, the first, second and third layers being opaque in the visible spectrum and being occluded, in the visible spectrum, from direct view of a sensor; (b) taking, at different times, measurements of infrared or ultraviolet light that has reflected from the first, second and third layers and is incident on the sensor, each measurement being a measurement of incident light intensity at a pixel of the sensor at a particular time; (c) identifying peaks in amplitude of a digital time-domain signal, which signal encodes the measurements; and (d) for each particular identified peak (i) selecting a time window that includes a time at which the particular identified peak occurs, (ii) calculating a discrete Fourier transform (DFT) of the time-domain signal in the time window, (iii) calculating a set of frequency frames, in such a way that each particular frequency frame in the set is calculated for a particular frequency in the amplitude spectrum of the DFT, which particular frequency is different than that of any other frequency frame in the set, (iv) calculating kurtosis of each frequency frame in the set, (v) selecting a subset of the frequency frames, in such a way that kurtosis of each frequency frame in the subset exceeds a specified threshold, and (vi) averaging the subset of frequency frames, on a pixel-by-pixel basis, to produce a frequency image for that particular identified peak, wherein the method produces at least a frequency image of the first layer, a frequency image of the second layer, and a frequency image of the third layer. In some cases, the method includes calculating, for each specific pixel in each specific frequency frame, a value that is equal to, or derived from, modulus of the amplitude spectrum of the DFT at the specific pixel at a specific frequency, which specific frequency is identical for all pixels in the specific frequency frame. In some cases, the method includes recognizing one or more text characters in a frequency image. In some cases, the identifying peaks includes: (a) identifying measurements that are each a candidate for being a peak; (b) calculating clusters of the candidates; and (c) for each specific cluster, (i) selecting a specific measurement in the specific cluster, which specific measurement is of a measured incident light intensity that is equal to the largest measured incident light intensity for the specific cluster; and (ii) setting time at which a peak occurred to be time at which the specific measurement occurred. In some cases, the identifying peaks includes: (a) calculating, for each measurement in the time-domain signal, parameter $E=u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal; (b) calculating, for each measurement in the time-domain signal, likelihood $$p = 4\left(\mathrm{erf}(|u|) - \frac{1}{2}\right)\left(\frac{3}{2} - \mathrm{erf}(|v|)\right),$$

where erf is the single-sided cumulative error function; (c) selecting candidate measurements, the candidate measurements being measurements for which parameter E exceeds a first threshold and likelihood p exceeds a second threshold; (d) performing k-means clustering to identify a set of clusters of the candidate measurements; (e) for each particular cluster in the set of clusters (i) identifying a particular time at which a global maximum of amplitude of measured light intensity for the particular cluster occurs, and (ii) calculating a specific time at which a peak occurs, by setting the specific time to be the particular time at which the global maximum occurs. Each of the cases described above in this paragraph is an example of the method described in the first sentence of this paragraph, and is also an example of an embodiment of this invention that may be combined with other embodiments of this invention.

In some implementations, this invention is an apparatus comprising: (a) a light source configured to emit terahertz light; (b) a sensor that is configured to take, at different times, measurements of light in the optical spectrum, each measurement being a measurement of incident light intensity at a pixel of the sensor at a particular time; and (c) one or more computers that are programmed (i) to identify peaks in amplitude of a digital time-domain signal, which signal encodes the measurements, and (ii) for each particular identified peak (A) to select a time window that includes a time at which the particular identified peak occurs, (B) to calculate a discrete Fourier transform (DFT) of the time-domain signal in the time window, (C) to calculate a set of frequency frames, in such a way that each particular frequency frame in the set is calculated for a particular frequency in the amplitude spectrum of the DFT, which particular frequency is different than that of any other frequency frame in the set, (D to calculate kurtosis of each frequency frame in the set, (E) to select a subset of the frequency frames, in such a way that kurtosis of each frequency frame in the subset exceeds a specified threshold, and (F) to average the subset of frequency frames, on a pixel-by-pixel basis, to produce a frequency image for that particular identified peak. In some cases, the apparatus is configured to produce a first frequency image of a first layer, a second frequency image of a second layer and a third frequency image of a third layer, when the apparatus is when positioned in such a manner that the light source illuminates with terahertz light an object that includes the first, second and third layers, which first, second and third layers are opaque in the visible spectrum and are occluded in the visible spectrum from direct view of the sensor. In some cases, the one or more computers are programmed to calculate, for each specific pixel in each specific frequency frame, a value that is equal to, or derived from, modulus of the amplitude spectrum of the DFT at the specific pixel at a specific frequency, which specific frequency is identical for all pixels in the specific frequency frame. In some cases, the one or more computers are programmed to recognize one or more text characters in a frequency image. In some cases, the one or more computers are programmed to, as a step in identifying the peaks, identify measurements for which a parameter exceeds a threshold, which parameter is defined in such a way that (i) increasing amplitude of the time-domain signal increases the parameter and (ii) decreasing first derivative of the time-domain signal increases the parameter. In some cases, the one or more computers are programmed: (a) to calculate, for each measurement in the time-domain signal, parameter $E = u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal; (b) to calculate, for each measurement in the time-domain signal, likelihood $$p = 4\left(\text{erf}(|u|) - \frac{1}{2}\right)\left(\frac{3}{2} - \text{erf}(|v|)\right),$$

where erf is the single-sided cumulative error function; (c) to select candidate measurements, the candidate measurements being measurements for which parameter E exceeds a first threshold and likelihood p exceeds a second threshold; (d) to perform k-means clustering to identify a set of clusters of the candidate measurements; and (e) for each particular cluster in the set of clusters (i) to identify a particular time at which a global maximum of amplitude of measured light intensity for the particular cluster occurs, and (ii) to calculate a specific time at which a peak occurs, by setting the specific time to be the particular time at which the global maximum occurs. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described herein.

What is claimed:
1. A method comprising:
(a) illuminating with terahertz light an object that includes at least a first layer, a second layer and a third layer, the first, second and third layers being opaque in the visible spectrum and being occluded, in the visible spectrum, from direct view of a sensor;

(b) taking, at different times, measurements of terahertz light that has reflected from the first, second and third layers and is incident on the sensor, each measurement being a measurement of strength of an electric field at a pixel of the sensor at a particular time, the electric field being a function of intensity of incident terahertz light;

(c) identifying peaks in amplitude of a digital time-domain signal, which signal encodes the measurements; and (d) for each particular identified peak
  (i) selecting a time window that includes a time at which the particular identified peak occurs,
  (ii) calculating a discrete Fourier transform (DFT) of the time-domain signal in the time window,
  (iii) calculating a set of frequency frames, in such a way that each particular frequency frame in the set is calculated for a particular frequency in the amplitude spectrum of the DFT, which particular frequency is different than that of any other frequency frame in the set,
  (iv) calculating kurtosis of each frequency frame in the set,
  (v) selecting a subset of the frequency frames, in such a way that kurtosis of each frequency frame in the subset exceeds a specified threshold, and
  (vi) averaging the subset of frequency frames, on a pixel-by-pixel basis, to produce a frequency image for that particular identified peak;

wherein the method produces at least a first frequency image of the first layer, a second frequency image of the second layer, and a third frequency image of the third layer.

2. The method of claim 1, wherein the method includes calculating, for each specific pixel in each specific frequency frame, a value that is equal to, or derived from, modulus of the amplitude spectrum of the DFT at the specific pixel at a specific frequency, which specific frequency is identical for all pixels in the specific frequency frame.

3. The method of claim 1, wherein the method includes recognizing one or more text characters in a frequency image.

4. The method of claim 1, wherein the method includes:
  (a) recognizing, in the first frequency image, content that is printed or written on the first layer of the object;
  (b) recognizing, in the second frequency image, content that is printed or written on the second layer of the object; or
  (c) recognizing, in the third frequency image, content that is printed or written on the third layer of the object.

5. The method of claim 1, wherein the method includes calculating a set of frequency images that includes a frequency image for each layer in a set of layers in the object.

6. The method of claim 1, wherein the identifying peaks includes identifying measurements for which a parameter exceeds a threshold, which parameter is defined in such a way that (i) increasing amplitude of the time-domain signal increases the parameter and (ii) decreasing first derivative of the time-domain signal increases the parameter.

7. The method of claim 1, wherein the identifying peaks includes identifying each specific measurement that has a statistical parameter which exceeds a threshold, which statistic parameter is a likelihood that the specific measurement is a local maximum of the time-domain signal.

8. The method of claim 1, wherein the identifying peaks includes:
  (a) identifying measurements that are each a candidate for being a peak;
  (b) calculating clusters of the candidates; and
  (c) for each specific cluster,
    (i) selecting a specific measurement in the specific cluster, which specific measurement is of a measured incident light intensity that is equal to the largest measured incident light intensity for the specific cluster; and
    (ii) setting time at which a peak occurred to be time at which the specific measurement occurred.

9. The method of claim 1, wherein the identifying peaks includes:
  (a) calculating, for each measurement in the time-domain signal, parameter $E=u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal;
  (b) calculating, for each measurement in the time-domain signal, likelihood $$p = 4\left(\mathrm{erf}(|u|) - \frac{1}{2}\right)\left(\frac{3}{2} - \mathrm{erf}(|v|)\right),$$

where erf is the single-sided cumulative error function;
  (c) selecting candidate measurements, the candidate measurements being measurements for which parameter E exceeds a first threshold and likelihood p exceeds a second threshold;
  (d) performing k-means clustering to identify a set of clusters of the candidate measurements;
  (e) for each particular cluster in the set of clusters
    (i) identifying a particular time at which a global maximum of amplitude of measured light intensity for the particular cluster occurs, and
    (ii) calculating a specific time at which a peak occurs, by setting the specific time to be the particular time at which the global maximum occurs.

10. A method comprising:
  (a) illuminating with infrared or ultraviolet light an object that includes at least a first layer, a second layer and a third layer, the first, second and third layers being opaque in the visible spectrum and being occluded, in the visible spectrum, from direct view of a sensor;
  (b) taking, at different times, measurements of infrared or ultraviolet light that has reflected from the first, second and third layers and is incident on the sensor, each measurement being a measurement of incident light intensity at a pixel of the sensor at a particular time;
  (c) identifying peaks in amplitude of a digital time-domain signal, which signal encodes the measurements; and
  (d) for each particular identified peak
    (i) selecting a time window that includes a time at which the particular identified peak occurs,
    (ii) calculating a discrete Fourier transform (DFT) of the time-domain signal in the time window,
    (iii) calculating a set of frequency frames, in such a way that each particular frequency frame in the set is calculated for a particular frequency in the amplitude spectrum of the DFT, which particular frequency is different than that of any other frequency frame in the set, (iv) calculating kurtosis of each frequency frame in the set, (v) selecting a subset of the frequency frames, in such a way that kurtosis of each frequency frame in the subset exceeds a specified threshold, and (vi) averaging the subset of frequency frames, on a pixel-by-pixel basis, to produce a frequency image for that particular identified peak, wherein the method produces at least a frequency image of the first layer, a frequency image of the second layer, and a frequency image of the third layer.

11. The method of claim 10, wherein the method includes calculating, for each specific pixel in each specific frequency frame, a value that is equal to, or derived from, modulus of the amplitude spectrum of the DFT at the specific pixel at a specific frequency, which specific frequency is identical for all pixels in the specific frequency frame.

12. The method of claim 10, wherein the method includes recognizing one or more text characters in a frequency image.

13. The method of claim 10, wherein the identifying peaks includes:
(a) identifying measurements that are each a candidate for being a peak;
(b) calculating clusters of the candidates; and
(c) for each specific cluster,
  (i) selecting a specific measurement in the specific cluster, which specific measurement is of a measured incident light intensity that is equal to the largest measured incident light intensity for the specific cluster; and
  (ii) setting time at which a peak occurred to be time at which the specific measurement occurred.

14. The method of claim 10, wherein the identifying peaks includes:
(a) calculating, for each measurement in the time-domain signal, parameter $E=u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal;
(b) calculating, for each measurement in the time-domain signal, likelihood $$p = 4\left(\text{erf}(|u|) - \frac{1}{2}\right)\left(\frac{3}{2} - \text{erf}(|v|)\right),$$

where erf is the single-sided cumulative error function;
(c) selecting candidate measurements, the candidate measurements being measurements for which parameter E exceeds a first threshold and likelihood p exceeds a second threshold;
(d) performing k-means clustering to identify a set of clusters of the candidate measurements;
(e) for each particular cluster in the set of clusters
  (i) identifying a particular time at which a global maximum of amplitude of measured light intensity for the particular cluster occurs, and
  (ii) calculating a specific time at which a peak occurs, by setting the specific time to be the particular time at which the global maximum occurs.

15. An apparatus comprising:
(a) a light source configured to emit terahertz light;
(b) a sensor that is configured to take, at different times, measurements of light in the optical spectrum, each measurement being a measurement of incident light intensity at a pixel of the sensor at a particular time; and
(c) one or more computers that are programmed
  (i) to identify peaks in amplitude of a digital time-domain signal, which signal encodes the measurements, and
  (ii) for each particular identified peak
    (A) to select a time window that includes a time at which the particular identified peak occurs,
    (B) to calculate a discrete Fourier transform (DFT) of the time-domain signal in the time window,
    (C) to calculate a set of frequency frames, in such a way that each particular frequency frame in the set is calculated for a particular frequency in the amplitude spectrum of the DFT, which particular frequency is different than that of any other frequency frame in the set,
    (D) to calculate kurtosis of each frequency frame in the set,
    (E) to select a subset of the frequency frames, in such a way that kurtosis of each frequency frame in the subset exceeds a specified threshold, and
    (F) to average the subset of frequency frames, on a pixel-by-pixel basis, to produce a frequency image for that particular identified peak.

16. The apparatus of claim 15, wherein the apparatus is configured to produce a first frequency image of a first layer, a second frequency image of a second layer and a third frequency image of a third layer, when the apparatus is when positioned in such a manner that the light source illuminates with terahertz light an object that includes the first, second and third layers, which first, second and third layers are opaque in the visible spectrum and are occluded in the visible spectrum from direct view of the sensor.

17. The apparatus of claim 15, wherein the one or more computers are programmed to calculate, for each specific pixel in each specific frequency frame, a value that is equal to, or derived from, modulus of the amplitude spectrum of the DFT at the specific pixel at a specific frequency, which specific frequency is identical for all pixels in the specific frequency frame.

18. The apparatus of claim 15, wherein the one or more computers are programmed to recognize one or more text characters in a frequency image.

19. The apparatus of claim 15, wherein the one or more computers are programmed to, as a step in identifying the peaks, identify measurements for which a parameter exceeds a threshold, which parameter is defined in such a way that (i) increasing amplitude of the time-domain signal increases the parameter and (ii) decreasing first derivative of the time-domain signal increases the parameter.

20. The apparatus of claim 15, wherein the one or more computers are programmed:
(a) to calculate, for each measurement in the time-domain signal, parameter $E=u^2 e^{-v^2}$, e being Euler's number, normalized amplitude u being amplitude of the time-domain signal divided by standard deviation of amplitude of the time-domain signal, and normalized first derivative v being first derivative of the time domain signal divided by standard deviation of first derivative of the time-domain signal;
(b) to calculate, for each measurement in the time-domain signal, likelihood $$p = 4\left(\text{erf}(|u|) - \frac{1}{2}\right)\left(\frac{3}{2} - \text{erf}(|v|)\right),$$

where erf is the single-sided cumulative error function;
  (c) to select candidate measurements, the candidate measurements being measurements for which parameter E exceeds a first threshold and likelihood p exceeds a second threshold;
  (d) to perform k-means clustering to identify a set of clusters of the candidate measurements; and
  (e) for each particular cluster in the set of clusters
    (i) to identify a particular time at which a global maximum of amplitude of measured light intensity for the particular cluster occurs, and
    (ii) to calculate a specific time at which a peak occurs, by setting the specific time to be the particular time at which the global maximum occurs.

\* \* \* \* \*